United States Patent
Mitola, III

(10) Patent No.: US 10,242,365 B2
(45) Date of Patent: *Mar. 26, 2019

(54) DOMAIN-SPECIFIC HARDWIRED ECOMMERCE LEARNING MACHINE

(71) Applicant: Hackproof Technologies, Inc., Cocoa Beach, FL (US)

(72) Inventor: Joseph Mitola, III, Cocoa Beach, FL (US)

(73) Assignee: Hackproof Technologies Inc., Cocoa Beach, FL (US)

( * ) Notice: Subject to any disclaimer, the term of this patent is extended or adjusted under 35 U.S.C. 154(b) by 552 days.

This patent is subject to a terminal disclaimer.

(21) Appl. No.: 14/825,813

(22) Filed: Aug. 13, 2015

(65) Prior Publication Data

US 2017/0046702 A1 Feb. 16, 2017

(51) Int. Cl.
*G06F 15/173* (2006.01)
*G06Q 20/40* (2012.01)
(Continued)

(52) U.S. Cl.
CPC ........... *G06Q 20/405* (2013.01); *G06F 9/524* (2013.01); *G06F 11/0721* (2013.01);
(Continued)

(58) Field of Classification Search
USPC ........................................................... 705/1
See application file for complete search history.

(56) References Cited

U.S. PATENT DOCUMENTS 6,006,264 A * 12/1999 Colby ..................... H04L 29/06
709/220
8,875,227 B2 * 10/2014 Kundu ................ G06F 21/6245
707/822
(Continued)

FOREIGN PATENT DOCUMENTS

CN 1059799 A 3/1992
CN 1467658 A 1/2004
(Continued)

OTHER PUBLICATIONS

Perkowski, Marek Andrzej, "Learning Hardware," Jun. 24, 2010, retrieved from http://web.cecs.pdx.edu/mperkows/CLASS_VHDL_99/tran888/lecture008-learning-hardware.pdf, retrieved Jun. 13, 2014, pp. 1-119.
(Continued)

*Primary Examiner* — Scott S Trotter
(74) *Attorney, Agent, or Firm* — Banner & Witcoff, Ltd.

(57) ABSTRACT

A domain-specific hardwired symbolic eCommerce machine is described that processes information via the hardwired mapping of symbols from one or more domains onto other such domains, computing and communicating with improved security and reduced power consumption because it has no CPU, no Random Access Memory (RAM), no instruction registers, no Instruction Set Architecture (ISA), no operating system (OS) and no applications programming. The machine provides web services by recognizing legal requests such as HTTP POST request and responding with an HTML web page. In some embodiments, the machine has no unconstrained RAM into which malware may insert itself and needs no anti-virus software.

20 Claims, 23 Drawing Sheets

(51) Int. Cl.
| | |
|---|---|
| G06F 21/56 | (2013.01) |
| G06F 21/71 | (2013.01) |
| G06F 21/57 | (2013.01) |
| G06F 9/52 | (2006.01) |
| H04L 29/08 | (2006.01) |
| G06F 11/07 | (2006.01) |
| H04L 29/06 | (2006.01) |
| H04L 12/911 | (2013.01) |
| G06N 99/00 | (2019.01) |

(52) U.S. Cl.
CPC .......... *G06F 11/0793* (2013.01); *G06F 21/56* (2013.01); *G06F 21/57* (2013.01); *G06F 21/71* (2013.01); *H04L 47/70* (2013.01); *H04L 63/123* (2013.01); *H04L 67/02* (2013.01); *G06N 99/005* (2013.01); *Y02D 30/40* (2018.01)

(56) References Cited

U.S. PATENT DOCUMENTS

| | | | |
|---|---|---|---|
| 9,490,885 | B1 | 11/2016 | Zheng et al. |
| 2011/0264721 | A1 | 10/2011 | Patel et al. |
| 2011/0302397 | A1* | 12/2011 | Mitola, III .............. G06F 9/524 712/241 |
| 2012/0131316 | A1* | 5/2012 | Mitola, III .............. G06F 21/57 712/241 |
| 2013/0064176 | A1 | 3/2013 | Hsu et al. |
| 2014/0223561 | A1 | 8/2014 | Mitola, III |

FOREIGN PATENT DOCUMENTS

| | | |
|---|---|---|
| CN | 1811630 A | 8/2006 |
| CN | 101236574 A | 8/2008 |
| CN | 102694756 A | 9/2012 |
| TW | 200937293 A | 9/2009 |

OTHER PUBLICATIONS

Perkowski, et al, "Evolvable Hardware or Learning Hardware? Induction of State Machines from Temporal Logic Constraints," Evolvable Hardware, 1999. Proceeding of the First NASA/DOD Workshop O N. Pasadena, CA, Jul. 19-21, 1999, pp. 129-138.

Wikipedia, "Field-programmable gate array," Feb. 4, 2013, retrieved Jun. 13, 2013 from: http://en.wikipedia.org/w/index.php?title=Field=programmalbe_gate_array&oldid=536512233.

Jul. 2, 2014 (WO) International Search Report and Written Opinion—App. PCT/US2014/013337.

Wikipedia, "Field-programmable gate array," Feb. 4, 2013, retrieved Jun. 13, 2013 from: http://en.wikipedia.org/w/index.php?title=Field=programmalbe_gate_array&oldid=536512233.

Jul. 30, 2015 U.S. Non-Final Office Action—U.S. Appl. No. 13/799,277.

Sep. 28, 2015 (WO) International Search Report—App. PCT/US2015/037182.

WebPHY DATABUS: "WebPHY DATABUS—A Web Server/Ethernet IP Core for FPGAs", Jun. 3, 2013, Retrieved from the Internet: URL: https:ljwww.youtube.com/watch?v=QQRmjNZXH5g, 1 page, retrieved on Sep. 17, 2015.

Magdaleno, et al., "A FPGA Embedded Web Server for Remote Monitoring and Control of Smart Sensors Networks," Sensors, vol. 14, No. 1, Dec. 27, 2013, pp. 416-430.

Arab, Gawen, "Web Server on a FPGA, without CPU, only VHDL (French)," Jan. 29, 2010, Retrieved from the Internet: URL:https://www.youtube.com/watch?, v=7syu5E, retrieved on Sep. 17, 2015, 1 page.

Anonymous: "Anatomy of an HTTP Transaction—Web Performance Monitoring and Optimization," catchpoint.com; May 14, 2013, Retrieved from the Internet: URL:https://web.archive.org/web/20130514104338//http://blog.catchpoint.com/2010/09/17//anatomyhttp; [retrieved on Sep. 18, 2015] p. 1-4.

May 20 2016 U.S. Non-Final Office Action—U.S. Appl. No. 14/321,097.

Jan. 3, 2017 (WO) International Search Report and Written Opinion—App. PCT/US2016/056809.

Jan. 12, 2016 U.S. Final Office Action—U.S. Appl. No. 13/799,277.

Jun. 7, 2018—U.S. Non-Final Office Action—U.S. Appl. No. 15/292,371.

Apr. 19, 2017—(CN) First Office Action—App 201480019881.X, Eng Tran.

\* cited by examiner

Fig 2A

2A10 Symbol a

2A20   ( )

2A30   'POST'

2A40   "IP"

2A31 'URL' 'www.x.com'

2A41 'IP' "123.4.5.6"

2A00

2A50

2A51 (Thing)

2A52 (Thing [Place])

2A53 {Path [Place1] .. [Place N]}

2A54 /Action (Actor) {Path [place (Object)]}\

2A55 <Cause (Actor) /Action \>

2A56 (Event [Place] (Time) /Action\)

Fig 2B

2B100
Specification of an eCommerce Machine (eCM) in text form:
"An eCommerce Machine (eCM) shall accept TCP IP packets from an Ethernet port 80, shall recognize HTTP protocol synchronization (Syn), GET, and POST requests containing e.g. Name, etc., and shall respond with an HTML web page to a GET or POST request with the appropriate HTML response(f(x)), e.g. of FORM f, input x, to the requesting IP address."

2B200
(Self (things [TCP IP (packet)(message)][HTTP (Syn)(GET URL) (POST frame[Name, Address, email, credit card number])] [HTML (Web Page) (frame)])
[places [Ethernet[In[Port_80]]], [TCP[In[Out], [HTTP], [HTML]
{TOP {[Ethernet[In([TCP[Port_80 [In (packet)]]] → [HTTP[Syn]}
{[Ethernet[In([TCP[Port_80 [In (packet)]]] → [HTTP[GET]}
{[HTTP[SYN x)]] → [HTTP[SYN (x+1)]]} {[HTTP(GET)]] → [HTML[Web Page]]}
{[HTTP(POST x)]] → [HTML[POST response(FORM(x))]]}
{[HTML (Web Page)] → [Ethernet[Out([TCP[Port_80 [Out (packet)]]]}})

©2014 Blackproof Technologies Inc.

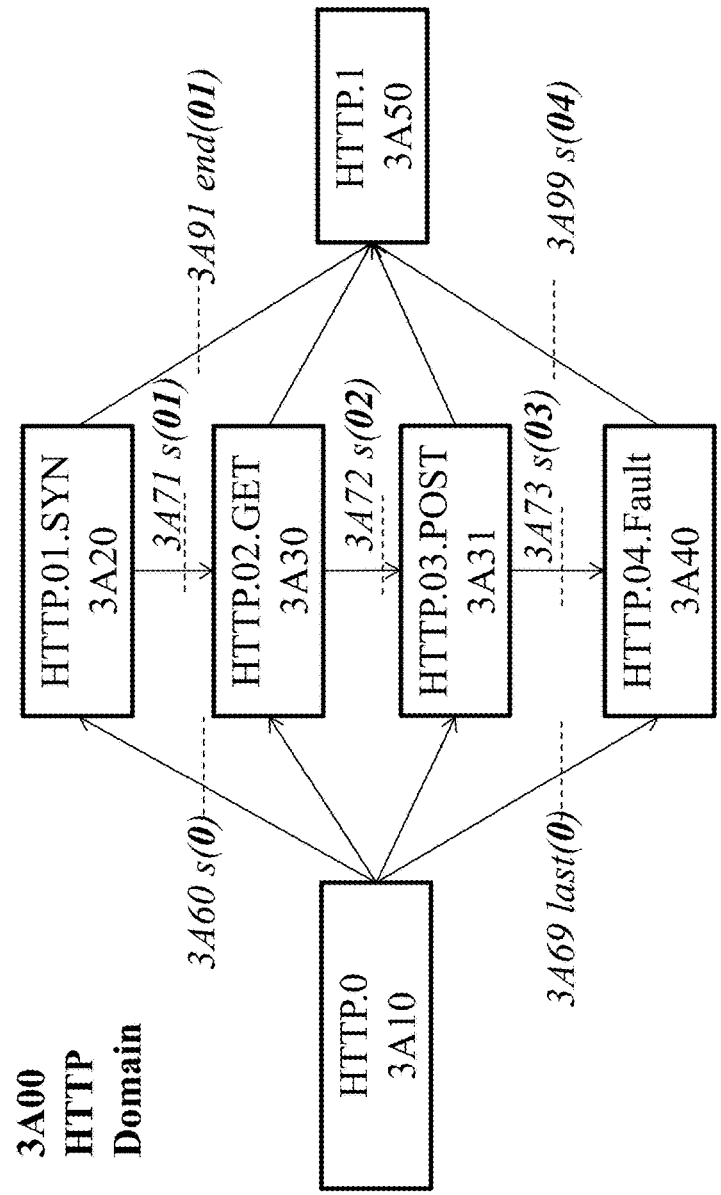

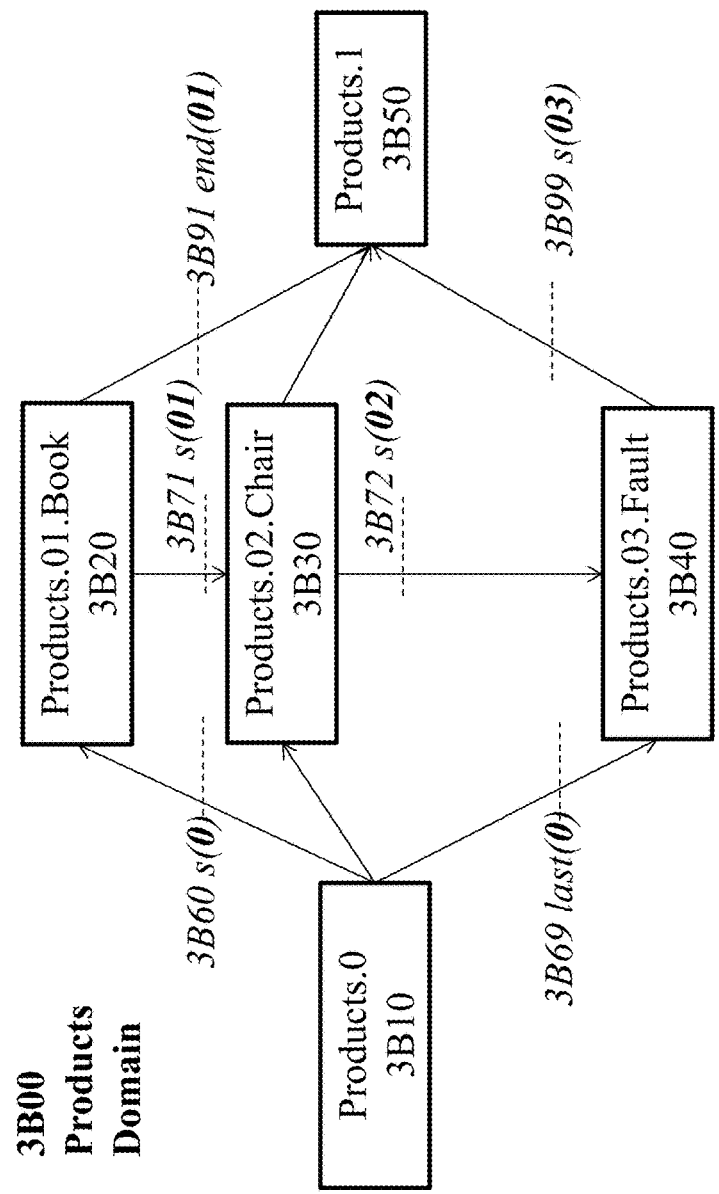

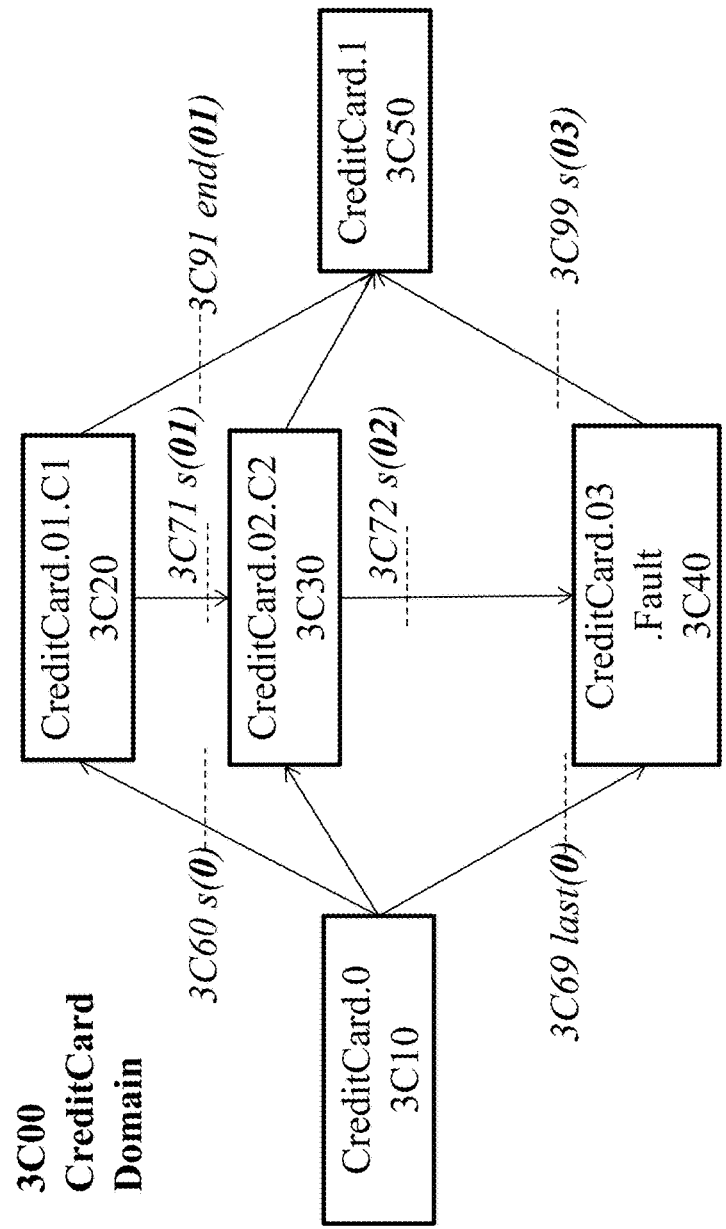

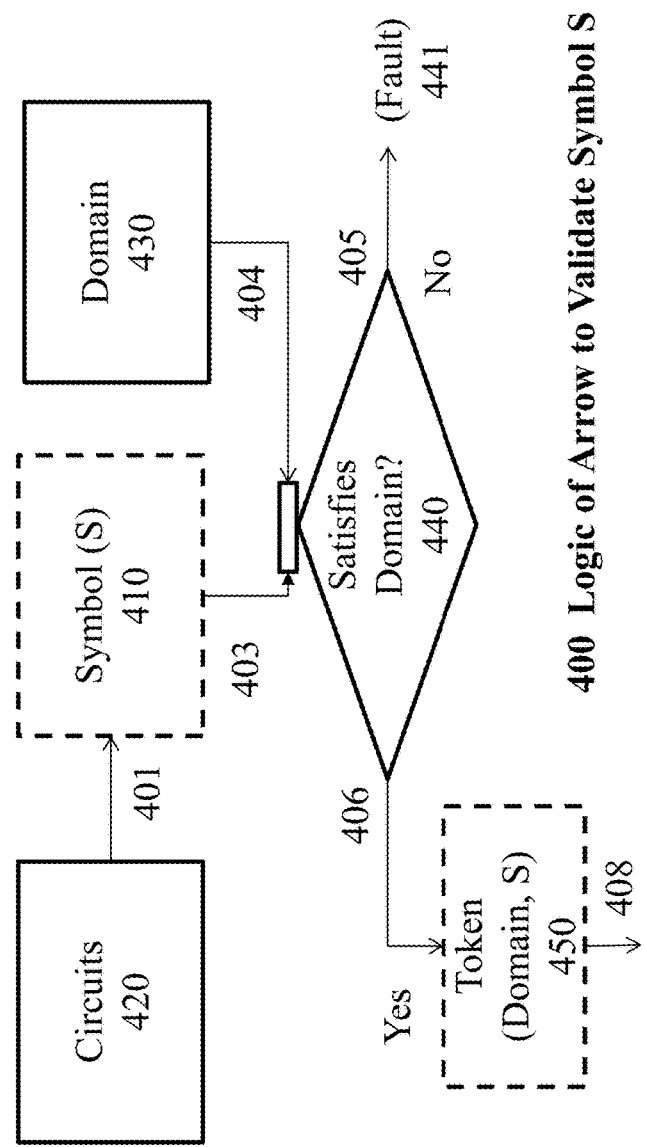

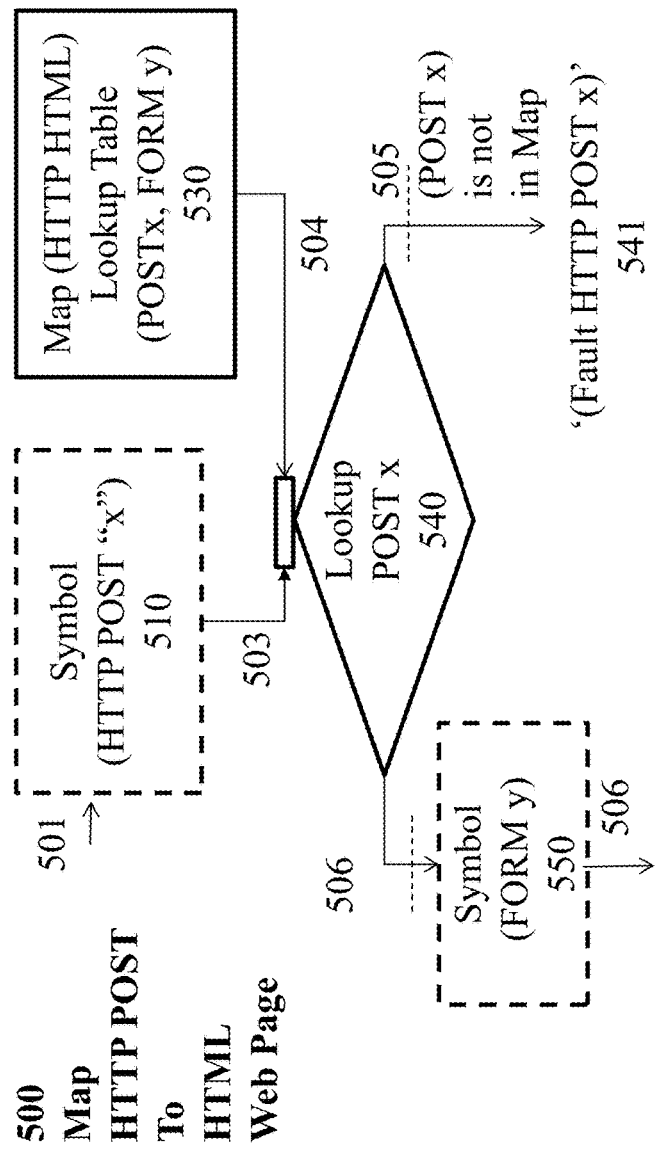

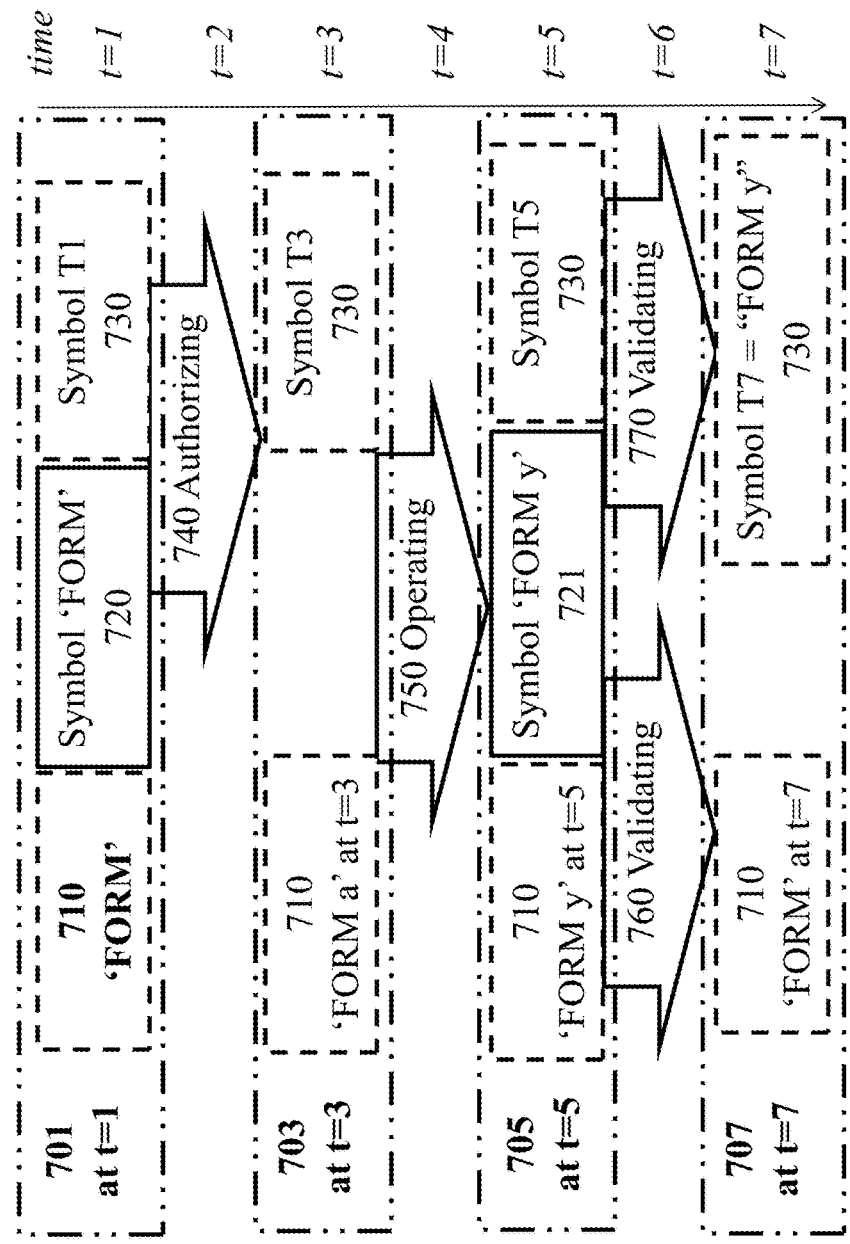

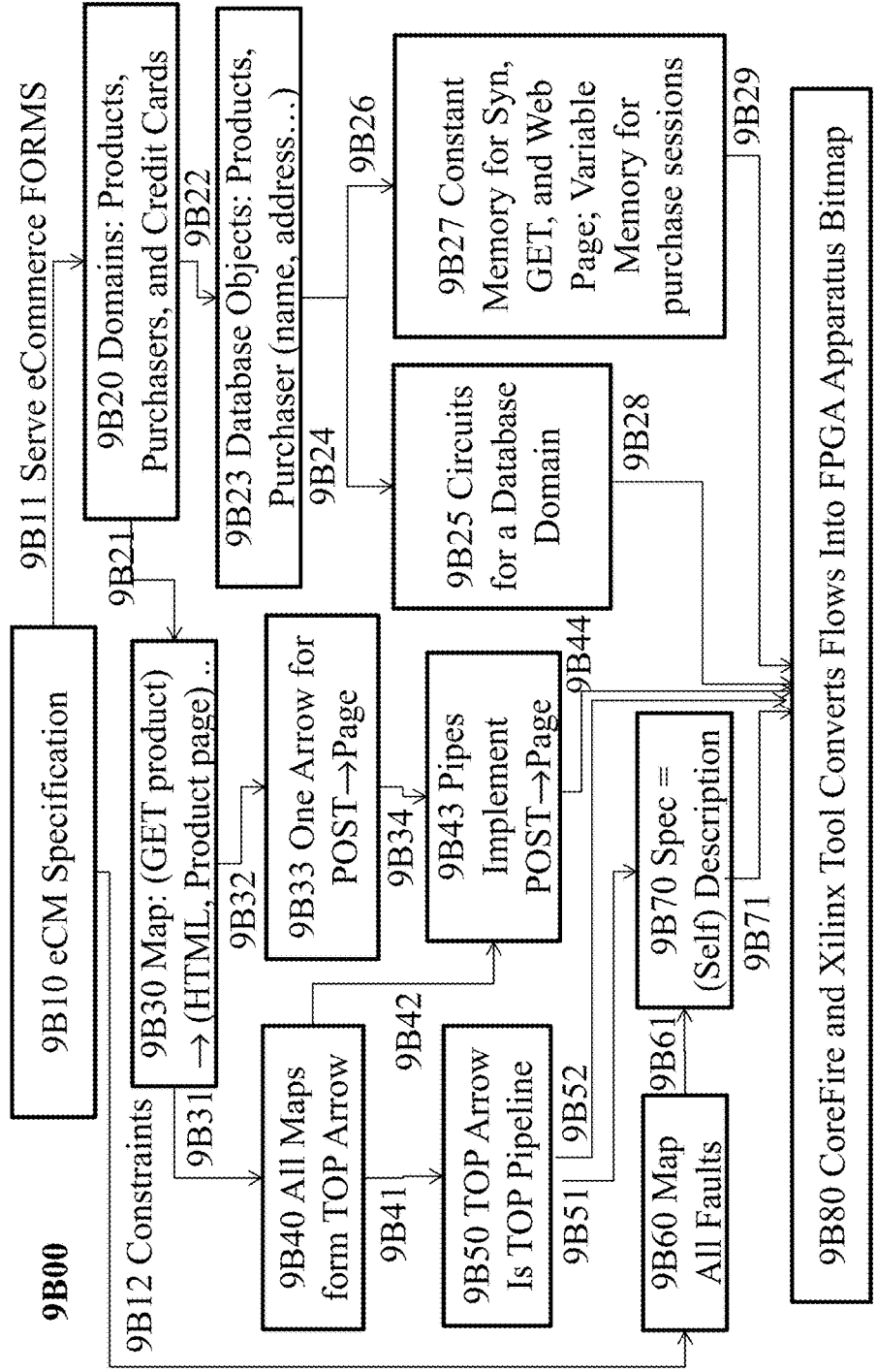

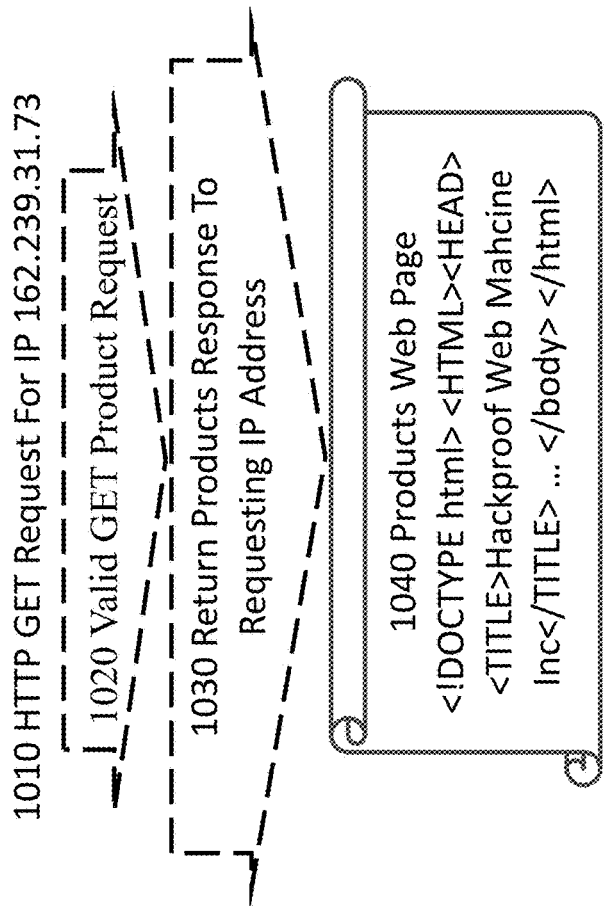

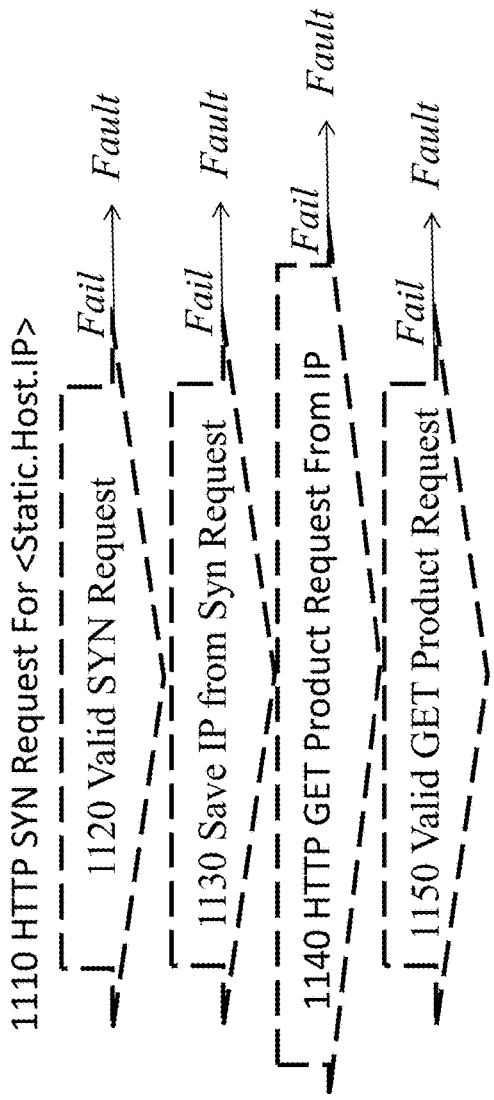

12B00 Circuit Concatenates Bit Level Constants With Input Data To Form IP Address

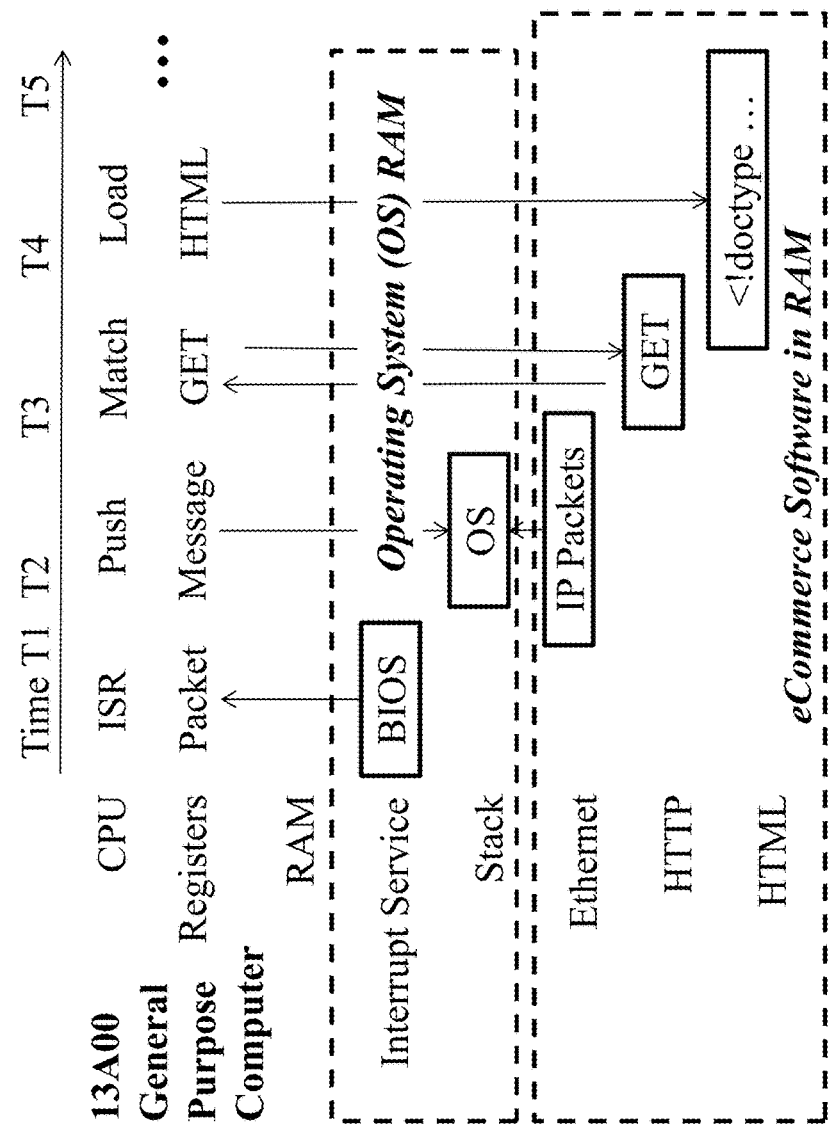

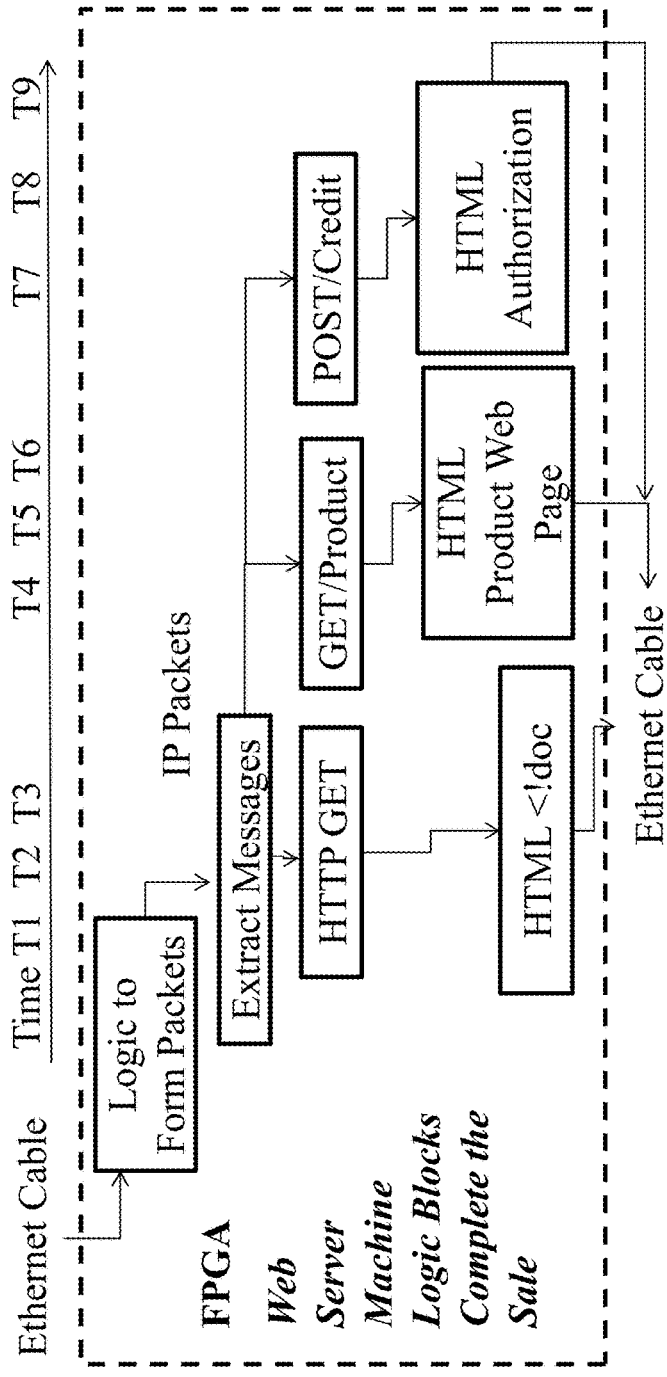

US 10,242,365 B2

DOMAIN-SPECIFIC HARDWIRED ECOMMERCE LEARNING MACHINE

CROSS REFERENCE TO RELATED APPLICATIONS

The present application is related by subject matter to U.S. non-provisional application Ser. No. 14/321,097, filed Jul. 1, 2014 (now U.S. Pat. No. 9,519,806, issued Dec. 13, 2016). The present application is also related by subject matter to U.S. non-provisional application Ser. No. 13/799,277, filed Mar. 13, 2013 (now U.S. Pat. No. 9,519,804, issued Dec. 13, 2016), which is a non-provisional of U.S. provisional application Ser. No. 61/760,913, filed Feb. 5, 2013, entitled "A Domain-specific Hardwired Symbolic Learning Machine." Each of the above-mentioned applications is incorporated by reference in its entirety.

COPYRIGHT AUTHORIZATION

A portion of the disclosure contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This application is related to secure computing and communications.

BACKGROUND

Current electronic commerce (eCommerce) is based on the Internet. eCommerce employs web page servers that incorporate processor elements (PE) such as a central processor unit (CPU) with an associated memory hierarchy of cache, random access memory (RAM), hard drive(s) and/or network storage. PE's may be organized into a system on chip (SoC) or network on chip (NoC) of many PEs and memories, such as a graphics processing unit (GPU), which may incorporate one or more application-specific integrated circuit (ASIC) co-processors, such as a floating point unit, or may incorporate a reconfigurable co-processor (e.g. a field programmable gate array (FPGA)). Computer programming languages such as assembly languages, C and C++ are known in the art for computationally efficient software libraries offering basic capabilities (e.g., an operating system (OS) such as Windows or Linux of a computing device). Other software packages can be created using other languages including higher level computer languages such as Java, PHP, and JavaScript for programming higher level services (e.g., web services using OS services). A virtual machine such as the Java Virtual Machine (JVM) may facilitate the use of a language like Java on a variety of computers having a variety of instruction set architectures (ISAs). Other virtual machines may comprise a sandbox within which software for one ISA may be interpreted on a CPU having another ISA. Web services may be provided to fixed and mobile devices like smart phones via a downloaded service from an eCommerce or other device accessible via a wired or wireless network. An arrangement of computing hardware, OS, virtual machines, and software may be computationally inefficient (e.g., because of the overhead of pushing and popping interrupt stacks in random access memory for software, virtual machines, and OS functions); and for performing cybersecurity overhead functions such as scanning for malware.

Machines having an arrangement of CPU registers, instruction set architecture (ISA), and memory, may be commonly referred to as Turing-equivalent (TE), and may be able to compute anything that is possible to envision. The register sequences of CPUs, PEs, and GPUs can be manipulated by malware to include subsequences that violate the authorized behavior of programming executed by computers and other devices connected via one or more networks. For example, a compromised network may be used to commit various cybercrimes, such as the theft of wealth via one or more data transfers. Conventional cybersecurity measures (e.g., hardware roots of trust, sandboxes, virtual machines, anti-virus, firewalls, and monitors) have been incapable of providing a permanent solution to such cybercrime.

Many types of cybercrime exploit Turing-Equivalence, for example, by exploiting the vast degrees of freedom, uncontrolled states of registers and memory, and sequences of instructions (which may never terminate) that compose Turing-equivalent machines. In other words, Turing-equivalence of shared CPU hardware, open ended nature of register sequences, layering of software, and re-programmability of local and networked memory systems may provide opportunities for malware to perform computing tasks that are not authorized and may result in, among other things, financial or physical damage.

BRIEF SUMMARY

This Summary is provided to introduce a selection of concepts in a simplified form that are further described below in the Detailed Description. This Summary is not intended to identify key or essential features of the invention.

An eCommerce machine is described herein that is configured in such a way as to preclude the entry of malware into itself, which reduces the effects of networked malware and provides a more permanent solution to cybersecurity. The domain-specific hardwired eCommerce learning machine described herein (also referred herein as an eCommerce machine, or a domain-specific hardwired eCommerce machine or eCM) may include, for example, a computing machine in which open-ended register sequences and uncontrolled memory states of conventional computing and communications do not occur. In other words, the hardwired eCommerce machine described herein is, for example, a machine with no CPU, no RAM, no instruction registers and no ISA.

In some embodiments, such a machine may organize data into symbols and may limit the symbols to members of enumerated sets called domains. Domains may be application-specific. For example, an eCommerce machine may include an input domain such as a set of valid HTTP SYN, GET, and POST requests for one or more web services. An eCommerce machine may include a management domain such as that provided by the Simple Network Management Protocol (SNMP) having data on such a machine termed a Management Information Base (MIB) that may be provided in response to an SNMP request. Such an eCommerce machine may incorporate, for example, a web page domain comprising, e.g. a set of valid HTML text representing web content. An eCommerce machine may include, for example, a "products" domain such as a set of valid HTML text and graphics representing products that are for sale or otherwise available for conducting an eCommerce transaction. An eCommerce machine may include, for example, a financial domain such as a set of text representing credit card numbers or other type of payment information for conducting the eCommerce transaction.

An eCommerce machine may allow for the use of fixed symbols and variable symbols. Fixed symbols may be encapsulated into hardwired memory constants such as read only memory (ROM). Variable symbols may be encapsulated into memory blocks that may be isolated from each other and may not be randomly accessed. Referring again to the hardwired constants that may form a fixed symbol, an eCommerce machine may incorporate hardwired constants into a self-specification, briefly noted herein as "(Self)" or a "(Self) description." (Self) may describe the intended information processing behavior of an eCommerce machine. (Self) may be written in a human language.

An eCommerce machine may encapsulate an information processing operation into isolated hardwired combinatorial logic termed a pipe circuit. A pipe circuit may be interconnected between pairs of domain-specific encapsulated objects such as for example flip-flop, register, or memory block. Instead of a shared-CPU performing instructions stored in memory, such a machine may realize the information processing functions of an application-specific sequence of conventional CPU instructions in a pipeline that may be a sequence of pipe circuits. Each pipe circuit may map (via its circuitry) a domain-specific value of a symbol contained in an input variable object into an intermediate value and may produce ultimately an intended domain-specific symbol as a variable output object. The input-output map of a pipe circuit may be hardwired to be consistent with a (Self) description. There may be two or more pipe circuits, each of which may perform an identical map between two different pairs of encapsulated variable objects.

Such a machine may accept external stimuli (e.g. in the form of text and multimedia content represented in variable objects from one or more distinguished input ports) forming a variable composite symbol termed a token. An electronic commerce machine may accept an HTTP POST request, forming a POST token. Such a POST token may be realized in a variety of ways such as the text "POST" or more simply as a signal of a circuit configured to be interpreted as a POST signal. Such a machine may realize information processing by copying content selected from an external input such as from a set of Internet Protocol (IP) packets into a token. Such a machine may realize information processing by moving such tokens, whether as data or as signals, systematically through special-purpose unidirectional hardwired parallel symbol processing pipelines (groups of which are also referred herein as arrows) to result in the delivery of tokens representing the results of information processing to one or more distinguished output ports. Such a machine may move a POST token referring to a product of a web page through an arrow to result in the delivery of a Product token to an output port. Such a machine may move a POST token referring to a credit card through an arrow to result in the delivery of an Authorization token to an output port. A pipe circuit may include a domain-enforcing circuit that may validate the conformance of a token to a domain (which has been hardwired into the machine, such as via a hardwired specification of such a domain in a (Self) description). Tokens and symbols entailed in token flow from input to output may be constrained via hardwired tests, e.g. of domain and for conformance to behaviors specified in a (Self) description.

Input stimuli forming tokens may be offered by one or more sensors or data communications interfaces such as a local area network or wireless link. Output tokens may be converted to text, graphics, voice, video, or other media (e.g. for external usage). The input ports, domains, maps, (Self) description, and output ports of such a machine may be immutable during operation, while allowing for extensibility via hardwired fault management circuits including learning, e.g. from a user, operating according to a hardwired (Self) description. Variable objects may enable tokens to flow through the immutable maps to provide information processing services such as secure networking, e.g. via a modulator-demodulator (i.e. modem). Such a machine may embody (e.g. in its pipes) the logic of the HTTP secure protocol, https. Such a machine may embody logic to provide, for example, email, database, or a spreadsheet; Internet access (e.g. world wide web), electronic commerce, and other valuable information processing services. The identification of such services does not limit the scope of this disclosure, but is provided by way of illustrative examples of preferred embodiments.

Further, upon encountering a fault, an eCM may provide fault recovery. A fault such as a request to purchase an item that is not for sale may result in a request to an authorized entity (human being or machine) for the incorporation of such an item into a list of products termed a products domain. In a preferred embodiment, such incorporation of new products may be realized via machine learning. A fault such as a request to make a purchase via a credit cared that is unknown to the eCM may result in a request from the eCM to an authorized entity (human being or machine) incorporating of such a credit card into a list of credit cards termed a credit cards domain. In a preferred embodiment, such incorporation of credit cards may be realized via machine learning.

Thus, an eCM, which comprises hardwired connections and domain-specific functionality, may be one implementation of (or may include aspects of) a Domain-specific User-defined Parallel Pipelined Learning (DUPPL) machine. As discussed throughout this disclosure, the domain-specific hardwired electronic commerce machine may be referred to as an eCommerce machine (briefly, an eCM). In some embodiments, operating as a purposefully configured web server for electronic commerce may be the machine's single function. To form an eCM, information processing functions for providing the eCM may be hardwired into ASICs, optical computing circuits, FPGAs, and/or other circuits or computing devices. An eCM may be simple, operating within a limited domain embodied as a domain-specific device such as an ASIC. An eCM may be flexible, operating within a specified set of domains and maps embodied in a flexible device such as a field programmable gate array (FPGA). Multiple simple and flexible eCMs may be interconnected by sharing domains. A collection of simpler devices, proximate or networked, may form a larger, more complex composite eCM capable of complex, networked electronic commerce services. Nevertheless, the function of a given chip, network, or system and of a composite machine or network of such eCMs may occur within the immutable boundaries of a given domain or set of domains that may be embodied into such an eCM via a (Self) description and that the machine itself may not change but may employ a (Self) description to limit its own behavior to authorized behavior.

Compared to a conventional Turing-equivalent computer, cybersecurity may be improved by an eCM through, for example, an eCM's hardwired immutability of information processing; inherent self-checking of domains; self-referential consistency of a (Self) description with its own behavior determined, for example, by comparing values of memory blocks and logic flows to a (Self) description; and by its arrangement of hardwired constants, encapsulated variable objects, and hardwired parallel pipelines. An eCM may need no virus protection because there is no unconstrained random access memory in which a virus or advanced persistent threat may be hidden, e.g. by a malicious agent. These properties of an eCM may introduce a new category of information processing machine that may neutralize a vast range of malware such as computer viruses, keystroke loggers, worms, and advanced persistent threats.

BRIEF DESCRIPTION OF THE DRAWINGS

FIG. 2A illustrates example notations of symbols that may be used in an eCM according to various aspects described herein.

FIG. 2B illustrates example notations for a (Self) description of an eCM, which includes both a notation having a text form and a notation having a symbolic form.

FIG. 3A illustrates an example of a domain for an eCM that provides examples of fixed objects for the hypertext transfer protocol (HTTP), such as GET and POST commands and relationships thereof.

FIG. 3B illustrates an example of a domain for an eCM that provides examples of fixed objects for electronic commerce products, e.g. in HTML, graphics, and relationships thereof.

FIG. 3C illustrates an example of a domain for an eCM that provides examples of fixed objects for financial transactions such as credit card numbers and relationships thereof.

FIG. 4 illustrates an example block diagram for a validation arrow for an eCM that validates a domain.

FIG. 5 illustrates an example block diagram for a map arrow for an eCM that maps one domain to another domain, e.g. mapping an HTTP request to an associated HTML response such as a FORM response to a POST request.

FIG. 7 illustrates examples of token processing, e.g. to validate a FORM token.

FIG. 9B illustrates an example flow chart that depicts a method for transforming a financial services specification into a representation of an eCM that can be implemented by a reconfigurable apparatus, such as an FPGA.

FIG. 10 illustrates a generalized flow chart of an eCM that receives an HTTP POST Request and responds with a credit card authorization or denial code.

FIG. 11 illustrates additional details of token processing that occurs within an eCM.

FIG. 13A illustrates a time line for the operation of a financial services on a general purpose computer having random access memory and an operating system.

FIG. 13B illustrates an example time line of operation of eCM having no random access memory or operating system.

DETAILED DESCRIPTION

Introduction to Terminology

Figure 1A:
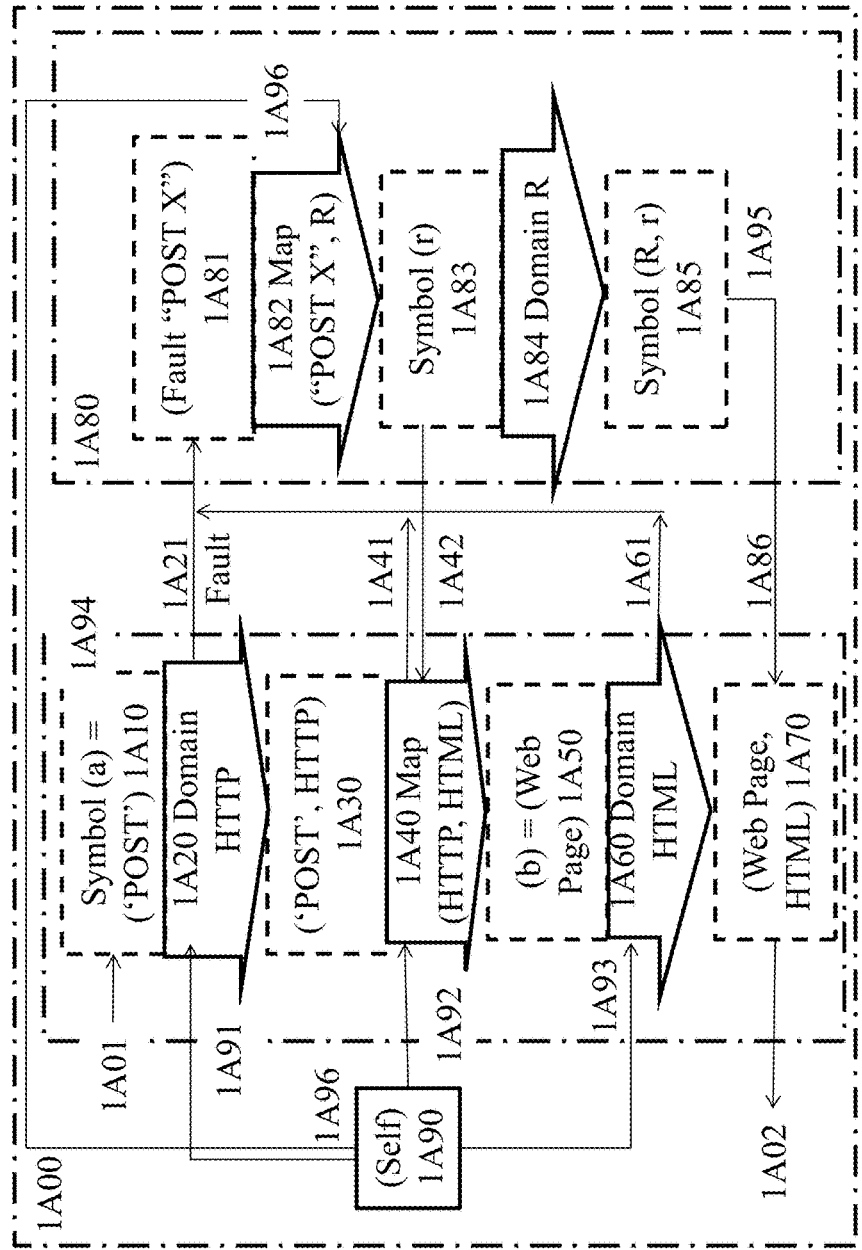
FIG. 1A illustrates an example block diagram of an apparatus configured to operate as an eCM according to one or more aspects described herein.

As discussed above in the brief summary, information processing functions of an eCM may be hardwired into the pipes of ASICs, optical computing circuits, FPGAs, and other circuits or computing devices that may comprise such a machine. A process of defining and building such logic may be adjusted in accordance with the needs of a service, a process that may be termed soft-wiring. When used throughout, the term hardwired refers to the fact that during operations, e.g. on the Internet, an eCM may comprise circuits that may not be changed during operation, e.g. as embodied into the fixed, hardwired bitmap defining the functions (also known as the personality) of an FPGA. When explaining eCM methods and apparatus that may be changed from time to time, such as by removing an eCM from a operation for a hardware update of circuits embodying information processing that may not be changed during operations, the term soft-wiring is used. Thus, an eCM is hard wired during operations, but such an eCM may be altered when not in operation, e.g. by uploading a new or enhanced FPGA personality. Over the long term, hardwiring is temporary and not completely inflexible, which requires the new term soft-wiring to most accurately emphasize the application of the eCM methods to realizing a hardwired eCM for operations while enabling alternative and evolved eCMs over the longer term.

Information of an eCM is stored and processed through the circuitry of an eCM in various forms. Such information forms may include: symbols, objects, tokens, domains, and a self-description, which is referred herein as "(Self)".

A symbol is textual data, the basic unit of information representation that conforms to a defined logical structure and is expected to be a member of a domain. For example, a symbol could be text such as "POST" and an additional symbol could be "Name: 'Joe'". An eCM may express a symbol as an object (e.g. Name) having a value (e.g. 'Joe'). Values of objects may be fixed and constant, that of a single symbol hardwired into such an eCM; or objects may be variable, capable of representing alternative symbols of a domain. For example, an object named "LegalRequest" may have a fixed value "POST;" a variable object named 'Name' may have a variable value "Joe;" a temporary value "Joe" at one point in time and a second temporary value "Mike" at another one point in time. An eCM will know how to process a symbol according to its meaning. A symbol can be used in various ways throughout an eCM. In some instances, a symbol may be able to "flow" through the circuitry of an eCM. When a symbol "flows" through the circuitry of an eCM, it is referred to as a token. A token named 'Request' may have a value 'POST', forming a token ("Request POST") that may flow through a comparison with, for example, a LegalRequest (as will be discussed in greater detail below), flowing further to generate a Transaction token, the text value of which may be provided to an isolated memory block representing, e.g. a current product display or financial transaction associated with a requesting IP address; and to an output port.

An object is the basic unit of information storage and retrieval. An object may contain exactly one symbol. An object may be variable, containing alternative different symbols, or an object may be fixed, containing exactly one symbol for the life of the eCM of which it is a part. A circuit containing such an object expressing one or more symbols may be termed a memory block. A memory block may comprise a hardware register capable of containing data; or in another example may comprise a small block of random access memory (RAM) with access available only via circuits dedicated to the usage of a particular memory block for storing and using symbols. An object may include both data and meta-data. For example, data at an input of an eCM may express the symbol "POST Name='joe'" expressing a request of a remote web browser for an eCM to record a Name having a value 'joe'. In this example, Name is the identity of an object for holding names, while 'joe' is the symbol to be stored into the Name object. Before such an action is accomplished, additional data about data termed metadata may indicate the status of the request in an expanded symbol such as "Requested: POST Name='joe'" where the string 'Requested' comprises a symbol expressing the fact that an action has been requested. Subsequently, logic may convert the status from 'Requested' to 'Rejected' or 'Accomplished'. Such an expanded symbol may move from one memory block to another in order to perform information processing. Such an expanded symbol with data and associated metadata that may flow through an eCM in conjunction with information processing is termed a token.

A domain is a listing of symbols. Each symbol that is listed is a member of that domain. For example, if a domain defines a listing of "HTTP 1.0" and "HTTP", the symbol "HTTP 1.0" and the symbol "HTTP" both may be members of a single domain, e.g. the domain of HTTP protocols. An eCM will know how to process symbols of a domain, for example, to test a symbol to determine whether the symbol is a member of the domain. For example, if the symbol to be tested is "HTTP 6.0" it would not be a member of the above domain. However, if the symbol was "HTTP 1.0" it would be a member of the domain of HTTP protocols. Members of a domain may be defined or otherwise listed using one or more convenient methods. One convenient method lists each member in a list such as "GET, POST" which is a listing of HTTP packet types, for example. Another convenient method lists each member in a brief form such as "00 . . . 99" which lists the one hundred two-digit numbers between zero-zero and nine-nine. A regular expression is another convenient method for listing all of the members of a domain according to a logical test for membership in a domain. For example, the regular expression "/^[A-Z][a-z]*$/" may match a name beginning with a capital letter and consisting of other lower case letters, matching both "Joe" and "Mike." Regular expressions may be termed RegEx. As another example, a RegEx /^[0-9][0-9]$/ may match text strings corresponding to numbers between 00 and 99, but may not match other pairs of characters or names. These methods of defining domains are illustrative of many alternative methods that may define or list directly or indirectly (via logical test) all of the members of such a domain. A domain may be abstract such as a protocol or may be concrete such as the contents of a specific web page, a name, a product description, a credit card number, etc. A domain may refer to things that are external to an eCM such as a place, e.g. via GPS coordinates; or to things that may be internal to an eCM, such as a (Self) hardware domain that may include a listing of the circuit boards of the (Self).

A (Self) may include a description of what the eCM can and cannot perform. The (Self) may include all domains and, thus, may indicate all symbols that may validly occur within an eCM. An eCM will know how to process the (Self) to, for example, identify a particular domain in order for a symbol to be validated against a domain. In some arrangements, (Self) is hardwired into the eCM and cannot be changed throughout the life of the circuit.

As is apparent from the above description and the additional details described below, an eCM is comprised of various circuits including memory blocks and pipes.

A memory block may be comprised of various circuitry components necessary for storing the symbols. For example, with respect to ASIC and FPGA designs, a memory block may be comprised of various flip-flops, registers, wires and the like. In general, a memory block stores a symbol. In some instances, the memory block may act as a constant (e.g., the stored symbol cannot be changed physically nor electronically for the life of the circuit); a variable object (e.g., have contents that can change throughout the life of the circuit, such as by storing different symbols at different points in time); and an address (e.g., store a symbol that refers to the location of another memory block). Thus, a memory block may be a circuit representing an information object whether fixed or variable that may have as its contents at a given time a symbol of a given domain.

Additionally, memory blocks may be associated with other memory blocks. For example, a constant (e.g., memory block acting as a constant) may be associated with a variable object (e.g., memory block acting as a variable object) such that the constant provides a label or name for the variable object. The constant may act as an address that defines where the variable object in located in the memory space of the eCM e.g., so that a third memory block containing a token may access the variable object with the constant as its address. For example, a memory block having the fixed value 'LegalRequest' may be adjacent to a memory block having the fixed value 'POST', associating a symbolic name 'LegalRequest' with a value 'POST'. In a related example, a memory block having the fixed value 'Request' may be adjacent to a memory block having the variable value "Put", associating a symbolic name 'Request' with a value "Put" in this example, not a legal request. The memory block associations of an eCM may be defined in the (Self) via a one or more symbols and/or domains.

The definitions of the symbols and/or domains in the memory blocks form a part of the reasons an eCM is able to defeat attacks/hacks that a conventional computing device is susceptible to. As mentioned above, conventional computing devices are susceptible to attacks that inject malware into, e.g. the random access memory (RAM) of an electronic commerce web server. One example is an SQL injection attack. Malicious statements may be inserted, e.g. into a data entry field of a browser providing a POST request to an electronic commerce web site so that the statements induce erroneous execution. For example, in an SQL injection attack, the single quote character, ', may be entered as a name. Such a value should be illegal as a name because it can cause a data base statement checking for "name" to check for "'" which may match every name in the database and return all database values to the attacker. The return of all database values to the attacker may be one of the purposes of the attack (e.g. to extract names and credit card numbers). In contrast, when an eCM is presented with a Request value of "'" such a value would not match a domain of legal values (e.g., of a "POST" domain); therefore, the eCM would not respond to the single quote by returning all values of the database and, thus, is able to defeat this type of attack. An SQL injection attack is just one example of myriad combinations of illegal inputs that are not fully checked by conventional software, resulting in data of use to a malicious attacker. The Heartbleed attack is another example by which an expected heartbeat query downloads up to 64 kilobytes of unauthorized data because, in this case, the heartbeat domain had not been sufficiently constrained by the network software. As specified herein, a DUPPL eCommerce machine incorporates a complete specification of each domain used by an eCM into the (Self), employing the (Self) specification via pipes termed domain maps to check each variable object of each domain, thus defeating all such attacks of which SQL injection and Heartbleed are illustrative examples.

A pipe is circuitry that is located between at least two memory blocks. The circuitry of a pipe may be comprised of logic necessary to perform one or more designated functions, such as AND-gates, OR-gates, NAND-gates, inverters, and the like. The designated functions are generally related to the service being implemented by the eCM. Pipes may take the contents of one memory block as input, process the input according to, for example, a map between two symbols or an arrow between two domains, to produce output that is stored in a memory block. For example, a pipe may include circuitry that validates that a symbol is a member of domain. In a specific eCM, for example, a "POST" value of a 'LegalRequest' memory block defining a 'LegalRequests' domain may be compared with a "Put" value of a 'Request' token, resulting in a failure of such a token to conform to the 'LegalRequests' domain. A (Self) hard wired into such an eCM may not allow a LegalRequest domain to be altered by pipes accessing the LegalRequest domain. On the other hand, a domain of names of electronic commerce customers may comprise a "Names" domain that may be extended by pipes accessing objects of such a domain provided conditions specified in the hardwired (Self) are met. A pipe may include circuitry that maps a symbol from one domain to a different domain. In a specific eCM, for example, a "POST" request having a Names value of a 'POST' token conforming to a 'LegalRequests' domain may further include a value to post, such as "POST Name='Joe'" that may be mapped to a (response) object having a value "(<html>Joe</html>)" of a 'Names' domain. This may mapping result in a successful determination of the token POST Joe to conform to the LegalRequests domain and result in a (Name) object <html>Joe</html> that conforms to an HTML Names domain. Note the use of the term "mapped".

As is evident from this explanation, a function of a pipe circuit may be to map an object of one domain to an object of another domain such that a memory block representing an object providing input to a pipe circuit may be acted upon by a pipe to yield an object of another domain in a memory block corresponding to a result of the logic of such a pipe. Therefore, a pipe circuit realizes a mapping function. Conversely any mapping function may be realized via a pipe circuit having an input memory block containing a representation (e.g. text) of an object of a given domain such as HTTP, operated on by the logic of such a pipe to realize the logical function to map from such an HTTP input object to a resulting output object such as an object of an HTML domain that may be represented in a memory block. The function of mapping one object to another therefore may be achieved by a pipe circuit having an input memory block representing an input object and having an output memory block representing an output object after the operation of the pipe circuit is complete, which realizes the corresponding mapping function. The use of the term map therefore refers to some pipe circuit realizing such a map, while the use of the term pipe refers to a circuit realizing a corresponding map. The term pipe is used when the invention is teaching about an apparatus having to do with an arrangement of circuits, while the term map is used when teaching about a corresponding method of organizing the information (objects) and operations on information (mappings) associated with such circuits.

The terms described above will be used throughout the disclosure when describing various embodiments of an eCM. Additional details of the circuitry used in an eCM will also be provided in connection with the various embodiments of an eCM. Additional details of the various forms information may take when stored or processed in an eCM will also be discussed in connection with the various embodiments.

Each circuit of an eCM may be associated with an information processing purpose and function. The purpose and function of a memory block circuit may be to represent an information object that may have a fixed symbolic name and that may contain a symbol as its value. The purpose of a pipe may be to map a symbol of an input memory block into a resulting symbol of an output memory block. Further, additional circuits or information forms, or variations on the above discussed circuits and information forms, may also be introduced in connection with the various embodiments of an eCM described herein.

FIG. 1A, eCM Domain-Specific Hardwired Symbolic eCommerce Machine

For ease of understanding the hardware of an eCM, various examples herein will utilize a web page service. Usage of this example does not constrain the applicability of this disclosure to any other services or from enumerating any other domain that may be required for an eCM implementing another service. For example, the basic hardware model of eCM may be used to convey a page of a spreadsheet or status of an electric power grid, or to search a database of credit cards. In such a spreadsheet example, Domain A={Row, Column}, which would be rows and columns of a spreadsheet to be displayed in a web page.

FIG. 1A illustrates an example domain-specific hardwired symbolic eCommerce machine (eCM) apparatus, also referred herein as an eCM or eCM apparatus. FIG. 1A, in particular, illustrates a configuration of logic circuits of such an eCM, allocating example logic functions of an eCM 1A00 to example pipes 1A94, 1A90 (Self), and 1A80 of logic circuits. Logical structure of such an apparatus may, for example, include a (Self) symbol 1A90 that may employ symbol notation to express the logic of the eCM; a logical element 1A94 that may realize an eCommerce service; and a fault management logical element 1A80 that may specify logic relating to logical errors that may be termed faults. An input network 1A01 may provide input data to a logical element 1A94. An input data analysis logic circuit 1A10 may obtain from an input network 1A01 an input symbol, i.e., symbol a, as illustrated at 1A10, having an example value equal to the text "POST" (briefly, (a)=("POST") in the drawing). A map circuit 1A20 may test a symbol, a, for conformance to a Domain A, of a map circuit 1A20, e.g. a Hyper Text Transfer Protocol domain, HTTP. The map circuit 1A20 may produce a resulting symbol 1A30, having an illustrative value ("POST", HTTP) that associates a symbol POST with a Domain HTTP. A map circuit 1A40 that may connect an input Domain A=HTTP to an output Domain B=Hypertext Markup Language (HTML) may accept a symbol "POST", 1A10, as input, and may generate a resulting symbol b=Web Page that may comprise text characters expressing a Web Page. The Web Page is represented in FIG. 1A at 1A50 as symbol b=(Web Page) at 1A50 and, as its value, symbol b may comprise a name or logical address as a string of text characters, which conform to a Domain B, HTML. Such a Domain B, HTML, may be expressed, for example, as a listing of various constraints according to which text may be determined to conform to a standard for representing a web page in the HTML format. A map 1A60 may test symbol b for conformance to Domain B, HTML, via a corresponding a pipe circuit. A memory block circuit 1A70 may contain the HTML contents of a (Web Page) object. Logic associated with such a memory block circuit 1A70 may convert symbol b referring to a (Web Page) to a form suited for transfer to an output circuit 1A02, such as by converting such HTML text to an Internet Protocol (IP) packet at output port 1A02.

Thus, logic circuitry 1A94 may accept an HTTP POST symbol at an input 1A10 to produce an HTML Web Page at an output 1A70, implementing a basic data flow of an eCommerce service. Circuitry 1A94 may provide an output text HTML Web Page to an output circuit 1A02. A basic data flow of an eCommerce service thus may be realized in circuits 1A94 of an eCM. The entirety of an eCommerce service may require fault management in order to effectively apply computations needed for possible input conditions.

Specifically, a fault management logic element 1A80 may determine the way in which an eCM 1A00 responds to faults that may be detected in various maps (e.g., detected by maps 1A20, 1A40, or 1A60). As illustrated, a detected fault may be conveyed to circuits 1A80 via fault indicator circuits 1A21, 1A41, 1A61. One example in which an eCM may respond to a fault is by ignoring all input that caused the detection of a fault (e.g., causing circuits 1A94 to not output a value from memory block 1A70. In other examples, an eCM may respond to a fault via machine learning that may be moderated by a (Self) description. Moderation refers to the application of the constraints of a (Self) specification; learning methods for preferred embodiments include moderated case-based learning where the (Self) specifies items that may not be learned such as items that may not be changed (e.g. the Self), constraints that may not be unlearned, such as whether to validate incoming information in a domain map 1A20, as further described in the methods explained in FIG. 9A below.

In some embodiments, a (Self) symbol 1A90 may indicate the logic of maps 1A20, 1A40 and 1A60 and of circuits 1A10, 1A30, 1A50 and 1A70. For example, a (Self) may include a notation (Self{[HTTP[GET]]=>[HTML[(WebPage]]} . . . ) enabling a an HTTP GET request to result in an HTML Web Page. A further notation within such a (Self)), for example, (Self . . . {(1A20 [HTTP[POST]])=>{ (1A21 [Fault])=>(1A80( ))}}) may indicate that within the domain map 1A20, an HTTP POST request should result in a Fault at 1A21 having a null result, e.g. indicated by an empty (thing) object, at object 1A80. Circuits 1A91 may convey such notations from (Self) 1A90 to Domain Map 1A20, to establish such results under different conditions, comprising a method of programming circuits 1A94 and 1A80 to produce results intended by the (Self). In some embodiments a (Self) symbol 1A90 may comprise and inform documentation that may be represented externally to an eCM apparatus. Further, in some embodiments a (Self) symbol 1A90 may be realized in a logic circuit of an eCM apparatus.

In order for map 1A40 to satisfy the conditions of being an arrow of category theory, the symbol 1A50, which results from Map(1A30, 1A50), must be a member of Domain 1A50. Therefore map 1A40 may validate symbol 1A50 as a member of Domain 1A50 of Web Pages. As with map 1A20, Map(1A30, 1A50) that is performed by map 1A40 may be subject to faults, such as the failure of a circuit. Therefore, a map 1A50 may detect faults, such as failure of the contents of variable memory block representing object 1A50 to conform to a Web Pages Domain. In response, a map 1A40 may clear the object at 1A50, specifically, the contents of a memory block circuit 1A50, not sending a response from an eCM, such as from logic circuits 1A40, 1A50, 1A60, and 1A70 to a network via circuits 1A02.

If symbol 1A50 is validated by map 1A40, the result may be provided to a network via maps 1A50, 1A60, 1A70 and 1A02 realized via corresponding circuits (e.g. pipes and memory blocks) of a corresponding apparatus. Similar to memory block 1A10, a memory block 1A50 may be isolated from all of the other memory blocks. Additionally, a memory block 1A50 may not be accessed randomly. Preventing random access to a memory block may limit values of memory block 1A10 entering further into such an eCM to only the domains embodied in circuits 1A20, such as of a Domain HTTP. Similarly, a symbol 1A70 validated by circuits of a map 1A60 of a Domain HTML of Web Pages may limit values of a memory block 1A70 exiting such an eCM to only the domains embodied in circuits 1A60, such as of a Domain HTML. In other words, an eCM may be considered domain-specific.

A memory block 1A50 may be validated by circuits of a pipe 1A60 for membership in a Domain HTML and thus may connect to an output symbol at 1A70 that may further comprise a circuit that may deliver content based on a symbol provided via an IP port 1A02 of a network. For convenience of reference, an input port 1A01 such as "Port 80" of an IP network 1A01 and an output port 1A02 such as "Port 80" of an IP network 1A02 may be associated into an input-output circuit such as an Ethernet LAN or a universal serial bus (USB) connection; or any other convenient input-output circuit.

To contrast the differences between an eCM and a conventional computer, in a conventional computer, such data would be generated in registers of a CPU and subsequently stored in a random access memory (RAM). However, within an eCM, there may be a rigorous flow of valid information via symbols containing both data and metadata (termed tokens) from a specific input port to a specific output port through a sequence of isolated memory blocks. Accordingly, an eCM performs information processing by at least processing symbols stored in various memory blocks, which may be isolated from each other (based on one or more intervening pipe circuits). As illustrated in FIG. 1A, the processing may be performed by information processing maps synthesized in various pipe segments.

The pipe segments of an eCM (e.g., pipe segments 1A20 and 1A40 of FIG. 1A) may together form a unidirectional portion of circuitry (e.g., tokens only flow one way through the circuitry) that may be referred to as a pipeline. In various arrangements, pipelines may include various numbers of pipe segments, but may not form loops. Looping behavior may be achieved by the regular transformation of inputs to outputs via a flow of tokens through the parallel pipelines of core circuits 1A00 and via networks 1A01 and 1A02. Such flow of tokens may update the state of memory of various blocks of such a machine. A circuit representing (Time) may provide an input to an eCM at a regular time interval. A (Self) 1A90 may specify such a time interval. eCMs may be paired so that one eCM provides inputs to another eCM, input ports attached to output ports establishing a flow of tokens in a looping arrangement between such machines that may be constrained to domains and maps of each machine with respect to the other.

Figure 1B:
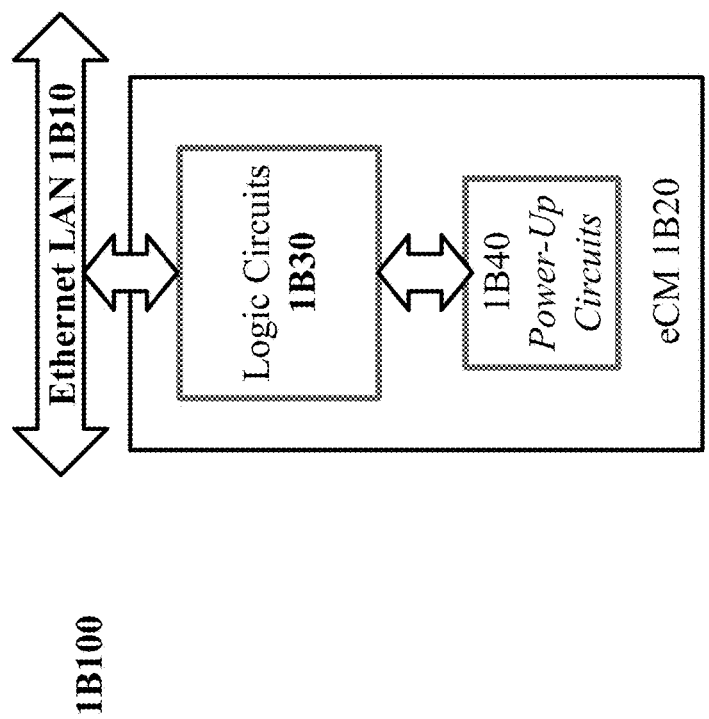
FIG. 1B illustrates a block diagram of a hardware configuration for an eCM according to various aspects described herein.

FIG. 1B, Example eCM Environment

FIG. 1B illustrates an example environment 1B100 where an eCM apparatus may be used to receive and respond to requests for a web page. By responding to requests for a web page, an eCommerce apparatus may perform functions such as the identifying, accumulating and purchasing of products for sale via the Internet. Network environment 1B10 may include a local area network (LAN) such as an Ethernet LAN connecting an eCM 1B20 to a networked device (not shown in the figure) such as a computer or smart phone. A networked device may contain a service such as a web browser that may request a web page via such network connections. The request may be routed to the eCM 1B20 via interconnected devices in the network environment 1B10 such as servers, routers, modems, switches and the like. The interconnected devices may be configured to route any request for one or more particular web pages or requests identifying one or more particular destination addresses to the eCM 1B20 for processing (e.g., a request for a particular World Wide Web address may be routed to eCM 1B20 or a request for a particular Internet Protocol version 4 (IPv4) or Internet Protocol version 6 (IPv6) address may be routed to eCM 1B20), An eCM 1B20 may comprise one or more logic circuits 1B30 that may realize logic such as that needed to provide web services including circuitry needed to provide the eCM 100 of FIG. 1. Additionally, an eCM environment for an eCM 1B20 may incorporate power-up circuits 1B40 that may be configured to initialize an eCM 1B20, e.g. as needed for a field programmable gate array (FPGA) upon power-up according to an example pattern of FPGA circuits disclosed hereinafter. In such an environment 1B100, input may enter eCM 1B20 via a network input 1B10 via, for example, an Internet Protocol (IP) associated with an Ethernet LAN (e.g. port 80, which is commonly used for requesting and receiving web pages). Input may include text (e.g. from a wireline network or wireless device or network). Text may include requests for web service, such as a hypertext transfer protocol (HTTP) request to get a page, e.g. a POST request, e.g. according to logic circuits 1A94 of FIG. 1.

An eCM 1B20 may comprise a hardwired machine such as logic circuits 1B30 that may be realized in a field programmable gate array (FPGA) chip, for example. Such logic circuits 1B30 may be initialized at power up by circuits 1B40 configured to load an FPGA personality into the logic circuits 1B30, e.g. of an FPGA. Power-up circuits 1B40 may comprise a conventional computer that is not connected to any device or network other than logic circuits 1B30 and that may contain data such as a bit map for an FPGA, the text of a web page, an IP address and other data needed for the initialization of logic circuits 1B30 realizing logic 1A00 of FIG. 1. Power-up circuits 1B40 may be embodied in any device or circuitry appropriate to load an FPGA chip at time of powering up such an FPGA chip, including, for example, a conventional computer. An example pattern of circuits to be loaded at such time are illustrated in circuits described in conjunction with FIGS. 6C, 7A, and 12A. In addition to or instead of FPGA, other configurable logic circuits such as optical computing, quantum computing (e.g. of a small number of Q-bits as are available at present), analog signal processing, analog electrical controls, flow controls, etc., may comprise logic circuits 1B30 and or power up circuits 1B40.

FIG. 2A, Symbol Notation for an eCM

FIG. 2A illustrates symbol notation for an eCM and provides additional details on Symbol a, 1A10 of eCM 1A00 from FIG. 1A. Specifically, a symbol 2A10 may be referred to in a textual specification or (Self) description as a generic symbol "a." Instances of such a generic symbol may include a blank symbol 2A20 comprising left and right parentheses. Such a blank symbol may indicate an empty symbol, which may comprise a textual delimitation within which a symbol may be expressed in a specification, for example. A blank symbol may represent a memory block in hardware that may specify that it is blank, e.g. by hardware proximity of coded bit patterns for left and right parenthesis, for example. A fixed symbol 2A30 may express a fixed item of text, memory, or hardware, such as the text characters 'POST' which may be the exact text expressing an HTTP POST request in a TCP IP packet from a remote web browser. A notation having single quotes around its object, such as 'POST', may express a constant symbol 2A30. A variable symbol 2A40 may represent a value that may be defined as having a default or present value and that at some point in the future and that may be subject to change, such as an Internet Protocol (IP) address of a computer sending a POST request via a network 1B10 of FIG. 1B. A symbol notation having double quotes may place double quotes around its object, such as "IP" indicating an unknown IP address. An association 2A31 of a fixed and variable symbol may indicate that a memory block 2A31 may have a fixed name in single quotes that may contain a fixed value in single quotes, such as a memory block named 'URL' containing a fixed value 'www.x.com;' the name of such an illustrative web site x.com may be fixed for the life of circuits in which it may be incorporated, e.g. as read only memory (ROM). An association 2A41 of a fixed symbol with a variable symbol may represent what is termed in prior art a named variable; a memory block 2A41 may have a fixed name, in this example, 'IP', in single quotes that may contain a variable value, such as a memory block containing a variable value of an IP address "123.4.5.6" that may consist of five numbers separated by periods also termed 'dots' according to IP usage.

In addition, employing further illustrative symbol notation of FIG. 2A50, a thing may be noted as '(thing),' 2A51. In an explicit notation, a fixed thing X may be noted as '(X)' while a variable thing X may be noted as "(X)". A more generic thing X that may be employed in a self-description to refer to ether a fixed or a variable thing, X, may be noted as (X) or to a collection of such fixed and variable things. Specifically, a (Self) thing may itself contain more specific things 2A51, such as via notation 2A51, for example, (Self ((packet) (message) (GET) (POST) (Web Page)); where a (Self) 1A90 may refer to eCM 1A00 as a (thing) comprising things, places, paths, actions, and causes described briefly between the two outer parenthesis of a (Self . . . ) symbol; within a (Self . . . ) a further symbol ((packet) . . . ) may list symbol notations corresponding to (things) comprising the self, such as a (packet), a (message), a (GET) request and a (POST) request and a (Web Page). Listing such (things)

within a (Self) notation 1A90 may specify that an eCM 1A00 in context 1B00 may receive one or more instances of a (packet) such as a (GET) request or a (POST) request that may be more specifically annotated in a (Self) description 1A90 of an eCM 1A00.

A (Self), 1A90, may incorporate further notation regarding things having relationships to each other such as proximity, e.g. of places 2A52, FIG. 2A, that may refer to specific details of a logical circuit of a (Self). A (Self . . . ) may incorporate further notation regarding places, noted as a (thing) with which is associated a [place], as (thing[place]) 2A52, FIG. 2A, that may refer to specific details of a logical circuit of a (Self). In 2B200, there may be [places . . . ] that may refer, for example, to an Ethernet port 80 circuit with a eCM 1A00 of FIG. 1 having an Ethernet port within its input logic 1A01, i.e. acting as an input that may be expressed as a symbol '(Self . . . [Ethernet[In[Port_80 ]]] . . . )'. In some embodiments, a circuit 1A90 may include a (Self) notation. In some embodiments, a (Self) notation may correspond to documentation. In circuit and documentation usage of symbol notation, a pair of outer parenthesis of the (Self . . . ), having leading and trailing parentheses, the notation may indicate the entirety of the (Self). In this example, the Ethernet is expressed as a [place] 2A52 of the (Self). A symbol "[In[" of a lager Ethernet port symbol 2B200 may express an input feature of an Ethernet circuit with respect to the (Self). In this example, the symbol "In" is a fixed symbol that may be expressed as notation 'In' according to symbolic notation. Thus, a more explicit symbol for Ethernet port 80 may include many single quotation marks, such as ('Self' . . . ['Ethernet' ['Input' ['Port_80'] . . . ] . . . ). A given (Self) may incorporate may such places. For the greater clarity of improved readability, a simplified symbol notation (Self) may refer to a more explicit symbol notation ('Self').

A simplified notation 2A200 may refer to constant symbols. A symbol notation 2A200 for an eCM may include other places that may correspond to logic of a eCM, such as a place for [TCP[In][Out]] that may correspond to logic of the TCP IP protocol. Another symbol for a place of a eCM may include a domain, such as a place [HTTP], e.g. that may list the elements of a Domain HTTP, such as 'SYN' and 'GET' e.g. (Self [HTTP (SYN, GET)]). A symbol notation 2A200 may include a place [HTML] in which there place may be an HTML object, such as a (Web Page). So a symbol notation for a (Self) may incorporate a variety of symbols that may express a specification.

A flow of information through a eCM may be expressed in a (Self) symbol as a {path . . . } 2A53 according to which a thing such as an (IP packet), or more simply (packet), may flow, for example, from an input port to a HTTP domain causing a related flow of a (Web Page) to an output port. According to notation 2A00, a {path} may be named; e.g. a top level path from input to output may be named {TOP . . . }. Such a top level path may include other paths e.g. that may correspond to maps 120, 140, and 160 of a eCM 100. Such maps noted by corresponding paths may in turn correspond to circuits of pipes that may realize the logic of maps, e.g. of maps 1A20, 1A40, and 1A60 of FIG. 1A. A top level path {TOP . . . } may express itself as a sequence of lower level paths. A path, 2A53, for example, named {TOP} may express more specifically a (packet) thing flowing from an Input Port 80 to an output port, more specifically as: {TOP {[Ethernet[In([TCP[Port_80 [In (packet)]] [HTTP [(request)]} {[HTTP (GET)]] [HTML [Web Page]]} {[HTML (Web Page)] [Ethernet[Out([TCP [Port_80 [Out (packet)]]}}. In such a case, the scope of the top level path extends from the first bracket, {, to the last bracket,}. For convenience of understanding the logic of such a eCM, a lower level path may be given a name according to notation 2A53. For example, a path {[Ethernet [In([TCP[Port_80 [In (packet)]] [HTTP[(request)]} may be referred to as a named path {Get_IP}, indicating that such a path may refer to circuits that may get a (request) thing realized, e.g. as a data object from packets of an Ethernet port. A circuit 1A91 from a (Self) circuit 1A90 to a map 1A20 may establish a logical relationship between the functions of a map 1A20 and the symbols of a {Get_IP} path of a (Self) 1A90.

Another path of (Self) 1A90 noted explicitly as {[HTTP (GET)]] [HTML[Web Page]]} may be noted for convenience as a path {Respond_to_GET_request} indicating that the logic function of such a path may be to respond to an HTTP GET request. Such an expression may simplify expression of a (Self). A circuit 1A92 from a (Self) circuit 1A90 to a map 1A20 may establish a logical relationship between the logic of a map 1A20 and the symbols of a {Respond_to_GET_request} path of a (Self) 1A90, such as that an HTTP GET request results in an HTML Web Page.

A further path of a top level path {TOP} may comprise {[HTML (Web Page)] [Ethernet[Out([TCP[Port_80 [Out (packet)]]}. Such a path may be referred to more conveniently as a named path {publish page}, indicating that such a path may convert a (Web Page) thing, realized for example as a data object of an HTML domain that may be located in an HTML place in a eCM. The function of such a thing may be a series of (packet) objects in an Ethernet output port circuit of such a device. A circuit 1A93 from a (Self) circuit 1A90 to a map 1A60 may establish a logical relationship between the functions of a map 1A60 and the symbols of a {publish_page} path of a (Self) 1A90, such as that an HTML Web Page may be converted to TCP (packets) for Ethernet output.

Thus, a {TOP} path may comprise three paths {Get_IP}, {Respond_to_GET_request}, and {publish_page}. An equivalent (Self) notation may express a path {TOP} as a sequence of these three named paths, i.e. {TOP {Get_IP} {Respond_to_GET_request} {publish_page}}. In various implementations, it may be convenient for a (Self) circuit 1A90 of FIG. 1A to connect via circuits 1A91, 1A92, and 1A93 to map 1A20, 1A40, and 1A60 according to such notation. In various implementations it may be convenient to express a (Self) symbol in documentation as a guide for circuit design.

A symbol 254 may express /action\, e.g. as a symbol '/Action (Actor) {Path [place 1 (Object)] [place 2(Object)] . . . [placeN (Object)]}\'. Such an action may include a (thing) as an (Actor) performing an /action\ on another (thing) as an (Object) such that such an (Object) may move along a {Path} consisting of a sequence of [places]. An eCM, for example, may contain a circuit that performs an action to send data down a path {TOP}. An Object may be a mobile (thing) such as an electrical signal, a set of signals coding for data, etc., capable of occupying places along a path such as memory blocks of data flows of paths of such a machine as may be specified in such notation of a path of such an action. Actions of symbols 2A54 may be internal or external. An action symbol of a (Self) 1A90 may have an internal circuit referent of an (information thing) moving down parallel pipelines of a DUPPL machine itself, e.g. performing pre-defined functions via core circuits 1A94 and performing fault recovery, machine learning, and self-reconfiguration actions via fault recovery circuits 1A80. An action symbol of a (Self) 1A90 may have an external referent of an actor external to such a machine that may be causing an external object to move down an external path that may be entirely external to such an eCM. An external action may result in the presentation of an input to an eCM via a port 1A01. An internal action may result in the generation of an output from an eCM via a port 1A02 realizing an externalized action, such as controlling an external entity such as traffic lights of a city, an electric power grid, or any of a multiplicity of controllable machines; and such as requesting an external action of a human being. Thus an action may occur along an external path that may include an eCM itself.

A symbol 2A55 may express a <cause>. Such a <cause> may comprise a (thing) initiating or constraining/action\. A symbol of a <cause> may refer to things and action in the physical world such as an automobile accident causing an injury. Circuits representing such an external <cause>, for example, may comprise a VHDL constant automobile accident: string :="<automobile causes>/(accident) {[healthy (person)] [injured (person)]}\"; A symbol of a <cause> may refer to things and action in an eCM itself, such as a choice of pipes down which a token may progress from an input symbol (Token T) of a memory block to an output 1A02. A <cause> may depend on a logic condition such as TRUE or FALSE and more generally on a domain of Beliefs. Common human beliefs include possible, impossible, inconsistent, unknown, and unauthorized in addition to true and false; there may be a degree of belief represented numerically in an eCM, such as a floating point number between −1 and +1 representing degree of belief from strongly negative to strongly positive. Within such an eCM it may be convenient to include a null belief, e.g. corresponding to an empty symbol ( ), [ ], etc. It may be convenient to refer to beliefs as (information things) of a Beliefs domain: (Beliefs (T) (F) (P) (IMP) (INC) (U) (X) (N)). According to criteria for each (Belief (thing)) there may correspond a circuit such as a data constant true: string :="(T)", e.g. forming a fixed symbol of a constant circuit, e.g. of Read Only Memory (ROM), or an ASIC or of an FPGA. Circuits for a <cause> may comprise circuits testing an (Actor) token for membership in a Beliefs domain. For example, a symbol 2A55 expressing <Cause (Actor) /Action \> may enumerate an alternative action for each alternative Belief of an actor, such as <cause (condition) [T /actionT\] [F /actionF\] [I /actionE] [U /actionU\] [X /actionX\] [N /actionN\]>. A Map(A,B) of a pipe 1A40 may incorporate circuits of a memory block for a variable object (condition) in associated circuits of pipes therefrom realizing a multiplicity of actions.

More generally, an expression of a (Self) 1A90, <cause (condition) /action\>, may have a circuit referent that may be specified, for example, in a VHDL process expression that may include conditional logic akin to an IF statement of a programming language. Such a VHDL statement may specify circuits action, e.g. of a circuit depending on the value of data in a memory block. A change of state (i.e. a change of value) of such a memory block may initiate an action, e.g. /actionX\ upon change of the state of memory block according to logic, e.g. of a VHDL statement, e.g. "process sensitivity (V); begin if X then block /actionX\; end block; end if; end process". Such VHDL statements are illustrative of logic that may be realized in any of a multiplicity of forms. A symbol <cause (condition) [T /actionT\]> may refer to a circuit having a VHDL behavior model process sensitivity (V); begin if T then block /actionT\; end block; end if; end process; for example.

A condition may result in an empty or "null" action ∧ whereby an eCM would not perform a further action, and a flow of objects may simply end in circuits corresponding to a null action expression ∧ of a (Self). Circuit referents for <causes> may include fork pipes disclosed more fully in FIG. 6A.

An event symbol 2A56 may express a composite (eCM information thing) comprising (Event [Place] (Time) /Action\). Such a symbol may signify that a specific /Action\ occurred at a given (time) and in a given [Place]. Event notation 2A56 offers one illustration of the multiplicity of combinations of notation 2A51-2A55 according to which symbols for thing, place, path, action, and cause may be combined to form expressions of a (Self) that may be more specific in a preferred embodiment. According to symbol criteria, an (Event) of a (Self) 1A90 may refer to an action, place, and time of the external space-time continuum, or to an event in a virtual or hypothetical world, such as Santa Clause coming to town. Such an (Event) may facilitate user interaction via machine learning circuits of fault recovery circuits 1A80. According to symbol criteria, an (Event) of a (Self) 1A90 referring to circuits of an eCM itself may refer to circuits of a pipe segment in a fixed [Place], for example within core circuits 1A94, performing a specified /action\ at a given (time) by circuits forming a symbol '(Event '[place]' "(time)" '/action\')' where double quotes may refer to the contents of a memory block containing a value of time, and single quotes refer to the place or action of such an event.

A symbol 2A51-2A56 may be empty signifying a null (thing) [place], {path},/action\, or <cause>, i.e. ( ), [ ], { }, ∧, < >.

An eCM and each of its parts such as wires, cables, power supplies, ASICs, optical switches, optical memories, optical pattern matching circuits, quantum components, FPGA chips, etc., may contain a (Self) description 1A90 of, e.g. its constituent things that may include (collections of (things)) as (domains) along with (abstract and concrete [places], {paths} /actions\ and <causes>) of symbols 2A51-2A56. A (Self) 1A90 may include a multiplicity of symbols expressing definitions, specifications, and examples of one or more eCommerce services relevant to an eCM. Domain symbols of a (Self) 1A90 may include definitions, specifications, constraints, and example members of a domain and non-members of a reference domain. Map symbols of a (Self) 1A90 may include a multiplicity of symbols expressing one or more eCommerce services with limitations and constraints of an eCM itself with respect to such a service. Symbols of a (Self) 1A90 may express limitations, capacities, response times, and information processing included and not included in a given eCM itself. Symbols of a (Self) 1A90 expressing constraints may exhibit identities of authorized users; time and location of authorized usage; and rules of business logic such as a Beliefs domain with <causes> of /actions\ expressed and embodied in circuits of an eCM itself, e.g. expressing legal uses of such an eCM.

There may be a further mathematical relationship between a symbol and an item of hardware such that for each circuit in hardware there is a corresponding symbol. There may be a further mathematical relationship between an item of hardware and a corresponding symbol such that for each constituent symbol of a given symbol there corresponds a circuit of such hardware; such a mathematical relationship between symbol and hardware then may be 1:1, complete (mathematically termed ONTO), and may have inverses. Constructing an item of hardware according to a symbol such that there may be 1:1, ONTO, and inverse mathematical relationships may embody mathematical properties of a symbol into such hardware. For example, a symbol may express a finite domain such as a set of valid HTTP requests;

corresponding hardware may embody such a symbol (e.g. as text 'HTTP') and as a list of HTTP requests to which such hardware will respond, such as 'Syn', 'GET', 'ACK', and 'POST'. Such explicit finiteness may impart advantages to hardware. For example, if malware expresses itself to the hardware as an HTTP request, a map of the hardware, not finding the malware expression in its finite domain HTTP, may respond to the malware as a fault or error (e.g., respond not as if a valid HTTP request was received), or may perform a null action, A, or may perform a logging action to /log\ the malware, or may respond according to business logic represented in symbols of a (Self).

Such symbols 2A10 through 2A56 may specify the contents of a category. Put briefly, a category may refer generally to a collection of objects and arrows having particular algebraic structure (e.g., an identity map exists for each object of each arrow of such a category). Each pipe circuit of an eCM may represent an arrow of a category of category theory (an example of which is termed a morphism in branches of mathematics). A collection of pipe segments along with memory blocks (e.g., those blocks acting as variable objects) together may realize the mathematical structure of categories with finite limits. By realizing the mathematical structure of such finite limit categories, an eCM may provide increased information security.

Further, due to the formulation and construction of an eCM, in at least some embodiments, an eCM may realize its symbols 2A00 and functions 1A00 in an FPGA chip 1B20 that contains no shared registers, no random access memory (RAM), no shared central processing unit (CPU) or other processing elements (PEs) of a Turing computer, and no stored program memories of any sort (e.g., no operating system, no applications programming). Despite not containing these components of a conventional computing device, an eCM may perform information processing via symbols, hardwired circuitry that map the symbols according to the domains of the (Self) descriptions, e.g. using symbol notation 2A00, e.g. embodied in an FPGA chip 1B20, and memory blocks storing the symbols that operate as the input, intermediate values, stored values, and output for the hardwired connections. Accordingly, an eCM, for example, may interact with a remote user, e.g. via the Internet with respect to an eCommerce web page without fear of a malicious software agent entering the eCM web server to change the function in such a way as to assist malicious action via the unauthorized use of the hardware, e.g. as was the widely reported nature of the StuxNet malware. Symbols of a (Self) comprising domains of a finite category may constrain the operations of circuits of an eCM such that unauthorized data may not be remotely accessed, e.g. as with the widely reported Hearbleed malware.

An eCM may be embodied in an ASIC and/or FPGA, and the examples throughout this disclosure are described in connection with an FPGA. However, embodiments of an eCM could be implemented using different computing devices, including optical computing, optical storage devices, optical switching; analog or digital charge coupled devices, and the like.

FIG. 2B, Example Symbol Notation of an eCM Self-Description

FIG. 2B illustrates a symbol notation for a (Self) description of an eCM having a form 2B100 of a document and having a form 2B200 of a symbol. The scroll indicating a document 2B100, for example, illustrates a specification of an eCM in text as it may be convenient for usage as a system specification. According to the method of symbols of this invention, there may be a mathematical relationship of domains, maps, and arrows of such an eCM specification and of a (Self) symbol further describing such an eCM. For example, according to 2B100, an eCM may be specified as a machine that "shall accept TCP IP packets from an Ethernet port 80; shall recognized HTTP protocol synchronization (Syn) and POST requests; and shall respond with an HTML web page to the requesting IP address." Accordingly, a symbol 2B200 may express such a specification in symbol notation.

A (Self) symbol 2B200 may include list of (things) such as a data (packet). Such a list of things may specify a usage context in symbol notation 2A00 as a [place]. A TCP IP protocol for example may be a named place '[TCP IP' having one or more objects (packet) as specified in symbol 2B200 of FIG. 2B. A place like TCP IP is an abstract place, e.g. an Internet protocol.

A symbol of a (Self) 2B200 may include a concrete place. A symbol '[In[' for example of a larger scope symbol '[Ethernet' may express circuits of a logical input such as a Port_80. Such a symbol 2B200 may express an input feature of an Ethernet circuit with respect to the circuits of the (Self). In this example, the symbol 'In' is a fixed symbol that may be expressed as notation 'In' according to symbolic notation referring to circuits realizing logic of an Ethernet circuit operating according to TCP IP and having a Port 80.

More explicit symbols in a (Self) corresponding to hardware of an eCM may include many single quotation marks referring to fixed constants, such as ('Self' . . . ['Ethernet' ['Input' ['Port_80'] . . . ] . . . ), for example. Also, for the greater clarity of improved readability, a simplified symbol notation (Self) may refer to such a more explicit symbol notation ('Self'). A simplified notation 2B200 may refer to constant symbols. A symbol notation 2B200 for an eCM may include other places that may correspond to logic of an eCM, such as a place for '[TCP' input '[In . . . ]' and output '[Out . . . ]' that may correspond to logic of the TCP IP protocol embodied in the circuits of the (Self) pipes and arrows 1A94 and 1A80. Another symbol for a place of an eCM may include a domain as a place [HTTP], e.g. that may list the elements of a Domain HTTP, such as 'SYN' and 'POST'. A symbol notation 2B200 may include a place [HTML] in which there place may be an HTML object, such as a (Web Page). So a symbol notation for a (Self) may incorporate a variety of symbols that may express a specification. In preferred embodiments, a (Self) specification may be complete and consistent because unlike a Turing-equivalent machine that Goedel proved may not be both complete and consistent at the same time, the finite domains and associated logic of an eCM may be both complete and consistent simultaneously, enabling consistent self-reference of symbols of (Self), e.g. as illustrated in 2A00 and as employed in 2B00.

A flow of information through an eCM may be expressed in a self-referentially consistent (Self) symbol 2B200 as a {path . . . } 2A53 according to which a thing such as an (IP packet), or more simply (packet), may flow, e.g. from an input port to circuits representing an HTTP domain causing a related flow, e.g. of data of a (Web Page) to an output port realizing an eCommerce service. According to notation 2A00, a {path} may be named; e.g. a top level path from input to output may be named {TOP . . . }. Such a top level path may include other paths that may correspond to maps 1A20, 1A40, and 1A60 of an eCM 1A00. Such maps noted by corresponding paths may in turn correspond to circuits of pipes explained further in other figures to follow that may realize the logic of maps, e.g. of maps 1A20, 1A40, and 1A60 of FIG. 1A. A top level path {TOP . . . } may express itself as a sequence of lower level paths. For example, a path {TOP} may express more specifically {TOP {[Ethernet[In ([TCP[Port_80[In (packet)]]→[HTTP[(request)]} {[HTTP (POST)]]→[HTML(Web Page)]} {[HTML (Web Page)]→ [Ethernet[Out([TCP[Port_80[Out (packet)]]}}. An arrow '→' of such a path may express a constraint, e.g. that a given object to the left of such an arrow such as [HTTP (POST)] may interact with and only with a given object to the right of such an arrow such as an [HTML (Web Page)]. In such a case, the scope of the top level path, TOP, extends from the bracket to the left of the name, {, to the balanced bracket, } towards the very end of such a (Self) symbol. For convenience of understanding the logic of such an eCM, a lower level path may be given a name according to notation 2A53. For example, a path {[Ethernet[In([TCP[Port_80[In (packet)]]→[HTTP[(request)]} may be referred to as a named path {Get_IP}, indicating that such a path may refer to circuits that may get a (request) object from packets of an Ethernet port. A circuit 1A91 from a (Self) circuit 1A90 to a map 1A20 may establish a logical relationship between the functions of a map 1A20 and the symbols of a {Get_IP} path of a (Self) 1A90. Other symbols of a (Self) may represent circuits of an eCM that comprise a complete, consistent eCommerce service.

Another path of a (Self) 1A90 noted more explicitly as {[HTTP (POST)]]→[HTML[Web Page]]} may be noted for convenience as a named path {Respond_to_POST_request} indicating that the logic function of circuits referred to by such a path may be to respond to an HTTP POST request. A circuit 1A92 of a (Self) circuit 1A90 may connect to a map 1A20 to establish a logical relationship between the logic of a map 1A20 and the symbols of a {Respond_to_POST_request} path of a (Self) 1A90, such as that an HTTP POST request results in a change to an HTML Web Page. Such a logic function may POST information with respect to a service domain such as a database of products, of credit cards, etc.

A further path of a top level path {TOP} may comprise {[HTML (Web Page)]→[Ethernet[Out([TCP[Port_80[Out (packet)]]}. Such a path may be referred to more conveniently as {publish_page}, indicating that such a path may convert a (Web Page) object of an HTML domain that may be located in an HTML place in an eCM into a series of (packet) objects in an Ethernet output port circuit of such a device. A circuit 1A93 from a (Self) circuit 1A90 to a map 1A60 may establish a logical relationship between the functions of a map 1A60 and the symbols of a {publish_page} path of a (Self) 1A90, such as that an HTML Web Page may be converted to TCP (packets) for Ethernet output.

Thus, a {TOP} path may comprise three paths {Get_IP}, {Respond_to_POST_request}, and {publish_page}. An equivalent (Self) notation may express a path {TOP} as a sequence of these three named paths, i.e. {TOP {Get_IP} {Respond_to_POST_request} {publish_page}}. In various implementations, it may be convenient for a (Self) circuit 1A90 of FIG. 1A to connect via circuits 1A91, 1A92, and 1A93 to map 1A20, 1A40, and 1A60. In various implementations it may be convenient to express a (Self) symbol in documentation as a guide for circuit design.

In 2B200, there may be [places . . . ] that may refer, for example, to an Ethernet port 80 circuit with an eCM 1A00 of FIG. 1 having an Ethernet port within its input logic 1A01, i.e. acting as an input that may be expressed as a symbol '(Self . . . [Ethernet[In[Port_80]]] . . . )'. In some embodiments, a (Self) notation may correspond to a circuit 1A90. In some embodiments, a (Self) notation may correspond to documentation. In circuit and documentation usage of symbol notation, a pair of outer parenthesis of the (Self . . . ) notation may indicate the entirety of the (Self). In this example, the Ethernet is expressed a [place] 2A52 of the (Self).

There may be mathematical relationships between a specification 2B100 and a symbol 2B200. One such mathematical relationship between a word, HTTP, in a specification 2B100 and a symbol 'HTTP' in a symbol 2B200 may be termed a one to one mapping (briefly, 1:1). One such mathematical relationship between a specification 2B100 and a symbol 2B200 may be that such a specification and such a symbol are complete with respect to each other such that a symbol may be complete with respect to a specification and a related specification may be complete with respect to a corresponding symbol; such a mathematical relationship of completeness may be termed mapping a specification ONTO a symbol and mapping a corresponding symbol ONTO a corresponding specification, briefly ONTO. There may be a mathematical relationship between such 1:1 and ONTO relationships that it does not matter whether one begins with a specification or begins with a symbol, both relationships 1:1 and ONTO apply; such a correspondence may be termed that 1:1 and ONTO each may have inverses.

There may be a further mathematical relationship between a symbol and an item of hardware such that for each circuit in hardware there is a corresponding symbol. There may be a further mathematical relationship between an item of hardware and a corresponding symbol such that for each constituent symbol of a given symbol there corresponds a circuit of such hardware; such a mathematical relationship between symbol and hardware then may be 1:1, ONTO, and have inverses. Constructing an item of hardware according to a symbol such that there may be 1:1, ONTO, and inverse mathematical relationships may embody mathematical properties of a symbol into such hardware. For example, a symbol may express a finite domain such as a set of valid HTTP requests; corresponding hardware may embody such a symbol (e.g. as text 'HTTP') and as a list of HTTP requests to which such hardware will respond, such as 'Syn,' 'GET,' and 'POST'.

Such explicit finiteness may impart advantages to hardware. For example, if malware expresses itself to the hardware as an HTTP request, a map of the hardware, not finding the malware expression in its finite domain HTTP, may respond to the malware as a fault or error (e.g., respond not as if a valid HTTP request was received). Malware insidiously masks itself as valid protocol data such as an HTTP request; since an eCM validates domain membership at every stage of information processing, e.g. via arrows 1A20 and 1A60 to perform information processing of a map 1A40, hierarchically as further explained with respect to FIGS. 6A and B below, only a completely valid HTTP request performing authorized actions on authorized blocks of data will be completely processed, rendering even such advanced persistent threats ineffective.

FIG. 3A an Example eCM Protocol Domain: HTTP

As explained above, a symbol for a place of an eCM may include a domain, such as a symbol for a an abstract place, the Internet protocol domain known in the art as Hypertext Transfer Protocol (HTTP) that may be denoted according to a symbol notation 2A00 as an abstract place, [HTTP]. A symbol for a place [HTTP] may contain a symbol for a thing contained in such a domain, such as, for example, a data object, 'SYN,' that may be noted in a (Self) as a (thing) (SYN), denoting a synchronization request of such an HTTP domain. Requests of [HTTP] may include 'GET' and 'POST' denoting requests to get or post information to a web page, e.g. in a form, denoted further together, for example, as [HTTP (SYN) (GET) (POST)]).

FIG. 3A illustrates example circuits of an eCM domain realizing a domain that may be noted [HTTP (SYN) (GET) (POST)]) according to notation 2A00 in a (Self) 1A90, e.g. as an illustrative Internet domain. Circuits of a domain [HTTP (SYN) (GET) (POST)] may be termed circuits for an HTTP domain 3A00. Circuits of such a domain, for example, may include a circuit 3A10 that embodies a fixed symbol 'HTTP.0', e.g. in a lookup table, in a register specifically hard wired to contain such a symbol, or in a block of memory configured to contain such a symbol for reference and configured in such a way that the memory block cannot be used for any other purpose. Such a symbol 'HTTP.0' may indicate that the circuit is serving as a point of entry into a collection of circuits expressing an HTTP domain. Further examples of circuits of such a domain may include: a circuit 3A20 that is configured to permanently store (or otherwise embody) a fixed sequence number 01 (the first member of such a domain) and that further is configured to embody a further symbol, e.g. storing a fixed object, 'SYN', indicating an HTTP synchronization request, according to notation for a circuit (e.g. in VHDL, noted HTTP.01.SYN at 3A20 embodying a fixed text value, 'SYN'); a circuit 3A30 that is configured to embody a second member of an HTTP domain, e.g. by storing a fixed object in memory. Such an object may be enumerated as such via a fixed sequence number 02 that further embodies a fixed data object, HTTP.02.GET, embodying a fixed text value, 'GET'; a circuit 3A31 that may embody a third member of an HTTP domain enumerated as such via a fixed sequence number 03 and that further may embody a fixed data object, HTTP.03.POST, embodying a fixed text value, 'POST;' a circuit 3A40 that may embody a fixed sequence number 04 and that further may embody a fixed data object, HTTP.04.Fault, embodying a fixed text value, 'Fault'.

Circuits of such an example domain may include a circuit 3A50 that embodies a fixed object, HTTP.1, an object that terminates a domain HTTP. Circuits of such a terminating object HTTP.1 may signal other circuits of a failure to match items of an HTTP domain. In some embodiments in usage validating an unknown data object X with respect to this HTTP domain, a circuit HTTP.0 may indicate a list of wires 3A60 indicating the first member to a last circuit 3A69 indicating the last member of a domain, enabling a comparison of object X to each object of such an HTTP domain, in a preferred embodiment matching all such enumerated members HTTP.01 to HTTP.03 in parallel, yielding a result HTTP.1, the end of the domain, in case there is no match to such a domain. Intuitively, HTTP.0 may be a circuit accessing all members of a domain HTTP while HTTP.1 may be a circuit accessing none of the members of such a domain. In a preferred embodiment for each domain there may be a circuit domain.0 (read "dot zero") accessing all members of a domain and a related object domain.1 (read "dot one") representing none of the elements of such a domain, but specifically as a terminating object of that domain. In some embodiments, circuits dot zero and dot one may interconnect across domains to realize further finite properties of domains, such as that one domain may form a subset of another domain.

Circuits of an example HTTP domain 3A00 may include a successor circuit 3A60, denoting the relationship "successor of zero" compactly as "s(0)"; more specifically s(HTTP.0) may indicate a successor object, HTTP.01.SYN of an object HTTP.0. An example successor circuit 3A71, s(01), more specifically s(HTTP.01.SYN) may indicate a successor object, HTTP.02.GET of an object HTTP.01.SYN. An example successor circuit 3A72, s(02), more specifically s(HTTP.02.GET) may indicate a successor object, HTTP.03.POST, of an object HTTP.02.POST. Other successor circuits may indicate further successors of a given object of such a domain. Ultimately, an enumerated object termed a "Fault" may enable a Fault object X having a value "Fault" to match an [HTTP] domain as an HTTP.04.Fault object. In some embodiments, such a Fault member of a domain may enable a fault object to match a given domain. Circuits of such a Fault object may connect domain circuits to fault management circuits or may handle faults (e.g. by ignoring an input that would attempt to use a successor of HTTP-.POST). Other successor circuits 3A91 through 3A99 may enable connection between each object of a domain and a distinguished domain terminating object, e.g. HTTP.1. Circuits 3A91 to 3A99 connecting a given object to a terminating object may indicate in circuits that a match to a domain object 3A20 through 3A40 has matched circuits of a domain HTTP. An example successor circuit 3A99, s(03), more specifically s(HTTP.03.Fault) may indicate a successor object 3A50, HTTP.1, a domain terminating object, of a starting object HTTP.03.Fault. An example type of successor circuit 3A91, end(01) may associate an object HTTP.01.GET with a terminal object 3A50, HTTP.1, more specifically s(HTTP.01.Syn) that may indicate a domain ending successor object 3A50, HTTP.1, of a starting object HTTP.01.Syn. Other relationships in addition to those thus far illustrated may be included in order to perform logic related to such a domain.

FIG. 3B an Example eCM Products Domain

As explained above, a symbol for a place of an eCM may include a domain, such as a symbol for one or more abstract places. An eCM may include a domain of products for sale or otherwise available for conducting an eCommerce transaction, e.g. a [Products] place at 3B00. The symbol for the place [Products] illustrated in FIG. 3B may contain symbols for all such products, Products.0 at 3B10; for specific products such as a book, Products.01.Book at 3B20; and/or specific products such as a chair, Products.02.Chair, at 3B30. In a preferred embodiment, a Products domain may include a Fault object at 3B40 and a domain terminating object, Products.1 at 3B50. Such a Products domain may include circuits 3B60 enumerating objects of such a domain, circuits 3B71 enumerating a successor of an object, and circuits 3B91 indicating the end of the domain with a terminating object Products.1 at 3B50. A products domain may consist of any number of different fixed data objects representing, for example, items for sale of a given eCM. Such a Products domain and its members may correspond to a (Self) notation [Products (Book) (Chair)] according to which circuits 3B00 may be validated as to number of products and members of a products domain via circuits 1A91 and 1A93.

Figure 14:
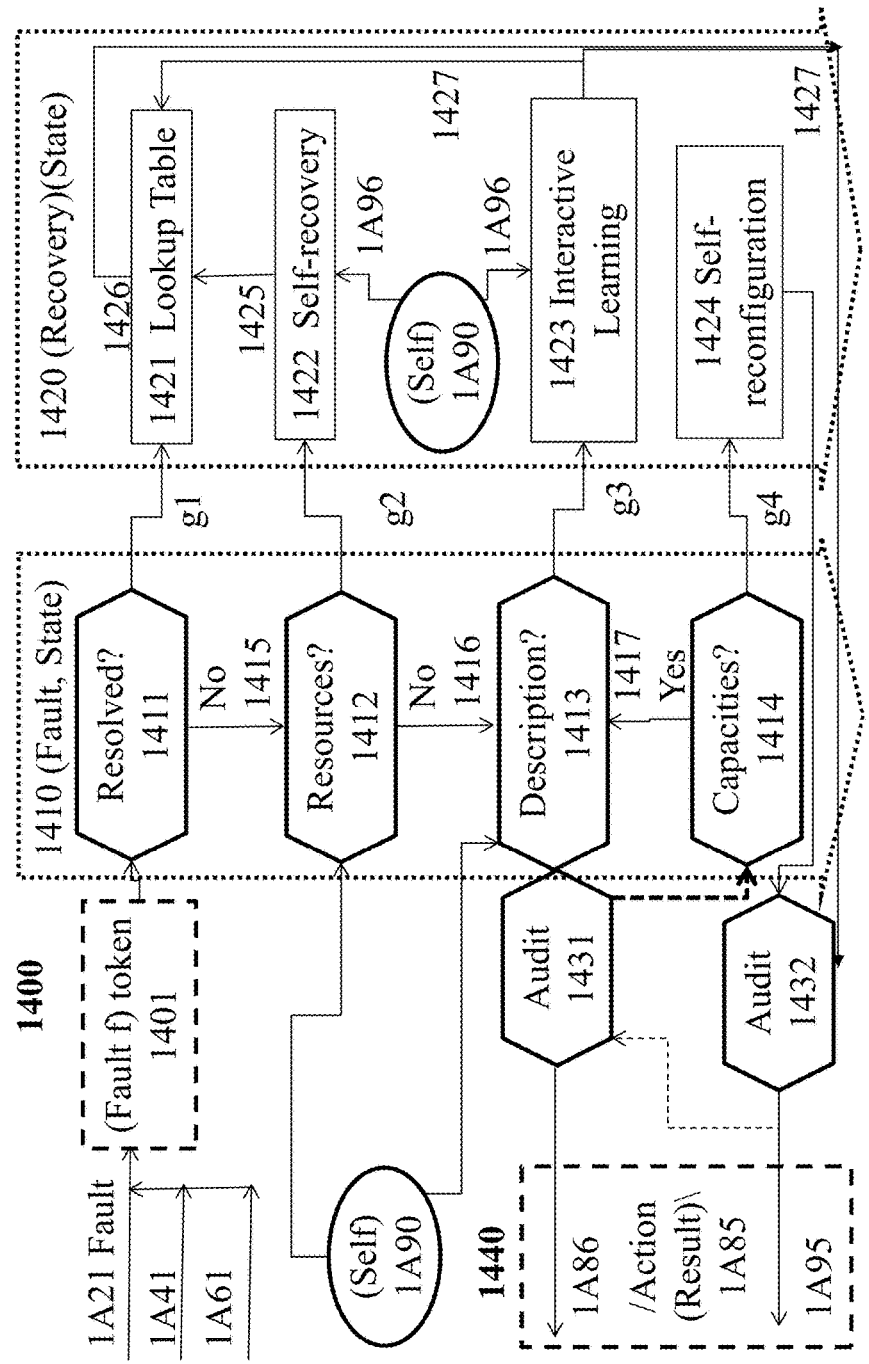
FIG. 14 illustrates machine learning operation of an eCM to automatically modify its own hardware as authorized by its internalized (Self) description and as enabled by networked entities including people and other machines.

A Products domain may be immutable, but products may be added to such an immutable domain via machine learning of fault management circuits 1A80 as disclosed further in connection with FIG. 14.

FIG. 3C an Example eCM Credit Card Domain

As explained above, a symbol for a place of an eCM may include abstract domains such as a domain of Credit Cards for conducting an eCommerce transaction or other type of payment information for conducting the eCommerce transaction, e.g. a [Credit Cards] place illustrated in FIG. 3B at 3B00. The symbol for a place [Credit Cards] may contain symbols for all such Credit Cards, Credit Cards.0 at 3B10; for a specific Credit Cards such as a card C1 having a card number 1234-5678-9101-1213 and associated information such as a name of a card holder, a billing address, a card expiration date, and additional information, for example embodied in circuits of a Credit Cards domain at Credit Cards.01.C1at 3B20. Other Credit Cards may be embodied in circuits Credit Cards.02.C2, at 3B30 and millions of such cards enumerated in circuits of such a domain. In a preferred embodiment, a Credit Cards domain may include a Fault object at 3B40 and a domain terminating object, Credit Cards. 1 at 3B50; such a Credit Cards domain may include circuits 3B60 enumerating objects of such a domain, circuits 3B71 enumerating a successor of an object, and circuits 3B91 indicating the end of the domain with a terminating object Credit Cards. 1 at 3B50. A Credit Cards domain may consist of any number of different fixed data objects representing, for example, credit cards known to an eCM. Such a Credit Cards domain and its members may correspond to a (Self) notation [Credit Cards (C1) (C2) . . . (C2,000,000)] e.g. containing two million credit cards according to which circuits 3B00 may be validated as to number of Credit Cards and members of such a Credit Cards domain via circuits 1A91 and 1A93.

A Credit Cards domain may be immutable, but Credit Cards may be added to such an immutable domain via machine learning of fault management circuits 1A80 as disclosed further in connection with FIG. 14.

FIG. 4, an Example Domain Validation Arrow

As explained above, an eCM may include a domain validation arrow 1A20 that may compare a symbol 1A10 to a domain A, for example an HTTP domain; such a domain validation arrow 1A20 may refer to circuits of a domain [HTTP] as illustrated in FIG. 3A; a comparable domain validation arrow may be included in an eCM for domains of FIG. 3B, 3C, and other such domains as may be convenient for representing eCommerce. FIG. 4 illustrates an example block diagram for the logic of circuits of an example domain validation arrow 1A20 of such illustrative domains of FIGS. 3A, 3B, and 3C. A symbol S at 410 comprising text, e.g. 'SYN' may enter an arrow 1A20 from a point external to such an arrow, noted as circuits 420 via circuits 401 for temporary storage in a memory block 410 of FIG. 4.

A memory block 410 may be isolated from other memory blocks of an eCM. In such an example, a symbol may not flow from a memory block 410 directly to any other memory block (e.g., to a memory block 1A30 of FIG. 1A or to any other memory block). Instead, a symbol may flow from a memory block 410 via one or more pipe segments having the logic of FIG. 4, such as via a domain validation pipe segment 1A20 having logic illustrated in FIG. 4. A symbol may flow from a memory block 410 corresponding to a memory block 1A10 of FIG. 1A to a memory block 1A30 of FIG. 1A via a pipe segment 1A20 that may comprise the logic of FIG. 4. In some arrangements, there may be only one way for symbols to flow from memory block 410 to memory block 1A30 such as through pipe segment 1A20 comprising the logic of FIG. 4.

In an eCM, a pipe segment may perform a domain membership test, as shown by pipe segment 1A20 of FIG. 1A, realized in some embodiments via the logic of FIG. 4. To ensure that symbol 410 is in fact a member of a given Domain, various checks may be performed. For example, symbol 410 may be compared to circuits of a Domain 430 to determine that the value of symbol 410, e.g. 'SYN' of an HTTP domain, may be found within a Domain of circuits 430. Pipe segment 1A20 may be realized as a fixed, unidirectional structure of combinatorial logic, e.g. according to FIG. 4.

By way of illustration in FIG. 4, circuits of a network 420 may obtain a symbol S to deposit such a symbol in a memory block 410. Logic circuits 440 may compare the value of a symbol stored in memory block 410 presented via circuits 403 with members of a domain that may comprise circuits 430 of FIG. 4. In an HTTP domain of FIG. 3A, circuits 440 may find a symbol S for 'SYN', 'GET', 'HEAD', 'PUT', 'DELETE' (e.g. idempotent HTTP methods) or 'POST,' etc. in circuits 430; circuits 440 may form a symbol (Domain, S) upon finding S in 430. For an HTTP domain of FIG. 3A, a symbol (HTTP, SYN) that may be stored in an output memory block 450. Such a memory block 450 may realize symbol 1A30 of FIG. 1. A symbol (HTTP, Syn) comprising notation for an object may be termed a token that may flow through an eCM from one memory block 450 realizing symbol 1A30 to another pipe such as pipe 1A40 of FIG. 1A. An eCM may comprise domain validating arrows having logic of FIG. 4 corresponding to domains of Products according to FIG. 3B, of Credit Cards according to FIG. 3B, and other such domains for eCommerce.

Suppose circuits 440 do not find the contents of memory block 410 in circuits 430; then circuits 440 may generate a (Fault) symbol 441, and circuits 405 may generate a domain fault signal 441, an error in which an input symbol is not found in a domain.

An eCM may be configured to expect that symbol of memory block 410 is a member of a Domain. A domain such as that illustrated in circuits 440 may be very specific such as depending on the web service being implemented by such an eCM. The determination performed by pipe segment 120 according to logic of FIG. 4 may produce a new symbol 450 indicative of the domain that was checked and the original input symbol, mapping a valid input 410 to a valid output 450.

In another example, a symbol S at 410 may be produced via TCP IP circuits 420 that may, for example, contain text "Put 162.239.31.72". The text "Put" could fail to satisfy the domain membership test performed by pipe segment 1A20 according to logic 400 (e.g. if "Put" is not found in the domain HTTP that may include 'POST' but not 'Put'). Accordingly, a pipe segment 1A20, according to logic 400 may ignore input of a memory block 410 containing text "Put", e.g. by clearing variable memory block 410 via a hardware reset line that may reset block 410 after receipt of such an input.

Referring to the context of FIG. 1, a pipe 1A20 testing a symbol 1A10 according to the logic 400 comprises one example of a domain test. Other symbols obtained from a network according to circuits 420 corresponding in some arrangements to circuits 1A01 may cause other symbols 450 configured by circuits 406 according to the symbol notation of FIG. 2A according to other types of web services.

Circuits 400 form a path between an input symbol 410 and a resulting symbol 450 according to a domain 430. Such a path may be known in the art as a hard wired information processing pipeline from 410 to 430 for successful validation of domain 430; failure of a symbol at 410 to conform to domain 430 may result in a fault 441 at fault indicating circuit 405. This pattern of circuits may occur in a variety of arrangements termed parallel pipelines as explained more fully in conjunction with FIGS. 6A and 6B.

FIG. 5, Mapping HTTP POST to HTML Web Page

FIG. 1 at 1A40 includes a map arrow. FIG. 5 illustrates an example block diagram of circuits of such a map arrow, for example mapping an HTTP request validated via HTTP domain map 1A20 realized in circuits according to FIG. 4 to an appropriate HTML response symbol (b) at 1A50. For example as illustrated in FIG. 5, a symbol may be obtained by circuits 501 and represented in memory block 510. In one embodiment, memory block 510 may realize the memory and associated logic of symbol 1A30 of FIG. 1A. In such embodiments, the logic of circuits of FIG. 5 may realize the function of map 1A40 of FIG. 1A. Map 1A40 may be explained as a pipe segment further described in FIGS. 6A, 6B, and 6C that may perform a mapping from one domain to another domain, for example according to the logic of circuits illustrated in FIG. 5. According to a logic test 540 of FIG. 5, a pipe segment may map an input that may occur in one domain to determine an output that may occur in another domain. Map 520, for example, provides a lookup table by which elements of a one domain are associated with elements of another domain. In this example map 520, a POST request is a valid member of an HTTP domain. As shown in the entry (POST, WebPage) of lookup table 520, a POST request may be associated with an object denoted by the text symbol 'WebPage' that occurs in the output domain of HTML responses listed in lookup table 520. A lookup table is just one example of the many alternative ways of enumerating a map between an input symbol 510 and a resulting symbol 540. Thus logic circuit 540 may look up any input symbol 510 in the lookup table 530 to determine an output for an arrow 1A40 realized by logic circuits 500. In one case, circuits 500 may generate a symbol (WebPage) as an output symbol 540, the generation of which may be signaled to other circuits via output signaling line 506; in another case, e.g. failing to find a unique match in map 520, circuits 500 may generate a (Fault) signal 531 that may stimulate other circuits to respond to such a failure of an input to be associated with an output in map 1A40 realized by circuits 500. In some arrangements, there may be exactly one result of a lookup circuit 540 for a given symbol 510 corresponding to a specific instance of map 520; at the same time a given result in map 520, e.g. FORM y, may correspond to one and only one input symbol at circuits 530; mathematically speaking, such a map may be termed at one to one map (notation 1:1).

The contents of a memory block 540 returning a response may be set only by circuits 504 of logic circuits 500, which may complete the logic function of mapping a value of a symbol 510 of one domain of a variable memory block 510 to a resulting variable memory block 540. A Map (HTTP, HTML) of lookup table 520 is shown to map a domain HTTP, for example including a POST request, onto a domain HTML, for example including various Web Pages. Such a map 1A40 may comprise a complete map termed an arrow if the logic 500 covers all of the possibilities between the two domains and thus achieves a degree of completeness of mathematical structure in mapping Domain HTTP onto Domain HTML via, e.g. lookup table 520. A lookup table is just one example of a finite map having a known or knowable number of possible input output matches. A regular expression (RegEx) provides an alternative to a lookup table when properly formed to cover only the authorized possibilities of an appropriately finite sets of inputs with resulting outputs of map 520. A mapping performed by an arrow 1A40 may satisfy the definition of a finite limit sketch category, as is known in the branches of higher mathematics of computability and of category theory. Thus a very simple computational device such as a lookup table with associated logic circuits 500 may realize in hardware a theory of computability that may reduce or eliminate malware from entering into an eCM or from using an eCM in a manner in which it was not intended.

Maps may be simple circuitry, such as the a logic of a lookup table 500; or may be more complex circuitry, such as a circuit to compare a variable content of a memory block to circuits describing a domain of legal requests embodied in the logic circuits via text or other data representing symbols according to notation 2A00 for example.

A further domain validation map 1A60 may comprise circuits according to the pattern of FIG. 4, e.g., testing a symbol (b) at 1A50 resulting from a map 1A40 of circuits according to the pattern of FIG. 5. Such an additional domain map 1A60 may validate a symbol (b) at 1A50 to form a validated (Web Page) object of an HTML domain illustrated in FIG. 1 at 1A70.

Symbols being output at a port 1A02 of FIG. 1A (e.g., further illustrated as, for example, comprising circuits of a network 1B10 of FIG. 1B) may be further converted by circuitry in the eCM. For example, the eCM may convert any symbol received at a port 1A10 to human-readable text, images, audio, etc. Users of an eCM or other devices attached to an eCM (e.g., via a display or via a network connection) then may be provided with the web data.

Circuits 500 form a path between an input symbol 510 and a resulting symbol 550 according to a domain 530. Such a path may be known in the art as a hard wired information processing pipeline from 510 to 530 for successful mapping between domains 530; failure of a symbol at 510 to conform to domain 530 may result in a fault 541 at fault indicating circuit 505. This pattern of circuits may occur in a variety of arrangements termed parallel pipelines as explained more fully in conjunction with FIGS. 6A and 6B.

Figure 6A:
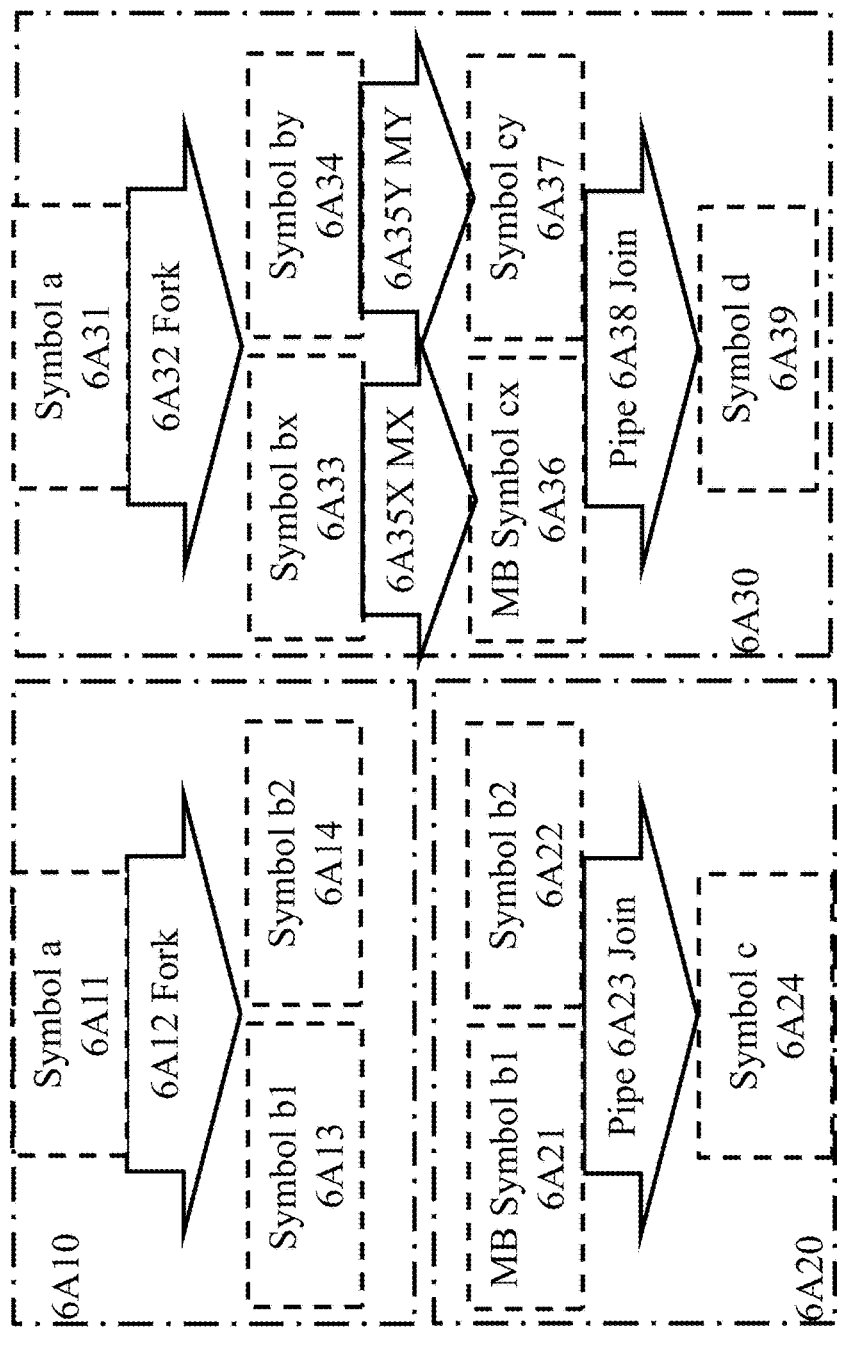
FIG. 6A illustrates examples of parallel pipes that may be formed by objects of memory blocks and arrows of pipes.

FIG. 6A Fork, Join, and Parallel Pipelines

Figure 6B:
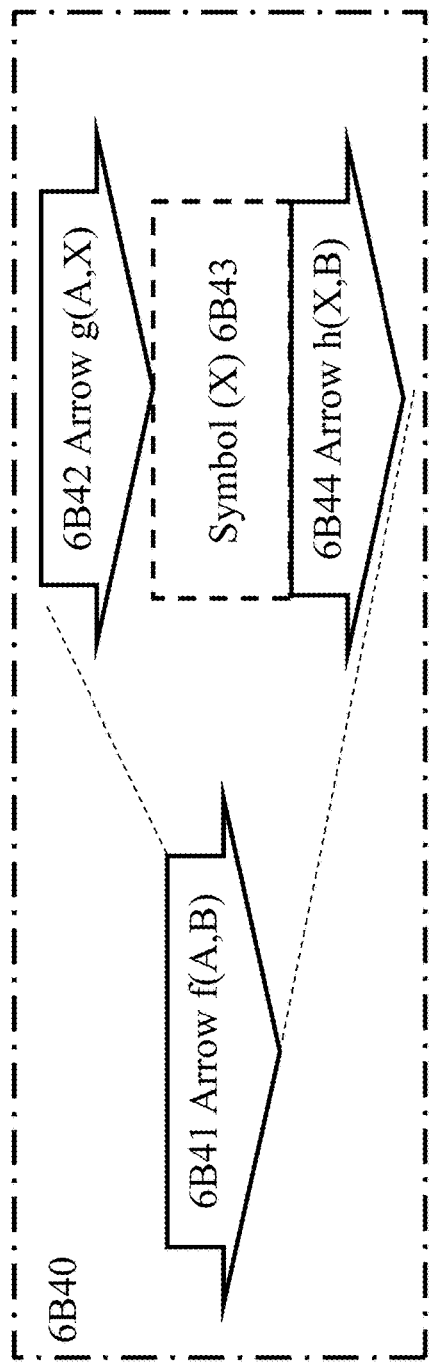
FIG. 6B illustrates an example of a hierarchical pipeline that may be formed by objects of memory blocks and arrows of pipes.

Maps of arrows 1A20, 1A40, and 1A60 of FIG. 1 may comprise circuits of patterns explained in conjunction with FIGS. 4 and 5. FIG. 6A illustrates examples of parallel pipes that may include pipes that fork, pipes that join, hierarchical pipes and pipes that may be formed by objects of memory blocks; pipes having completeness with respect to domains may comprise arrows of pipes in a DUPPL machine. An eCM may employ such parallel pipelines as further illustrated in FIGS. 6C, 7, and 12A FIG. 6B Hierarchical Arrows FIG. 6B illustrates examples of hierarchical arrangement of pipes and memory blocks that may be termed a hierarchical arrow of a DUPPL machine. An eCM may employ such hierarchical arrows as illustrated further in FIG. 6C.

Figure 6C:
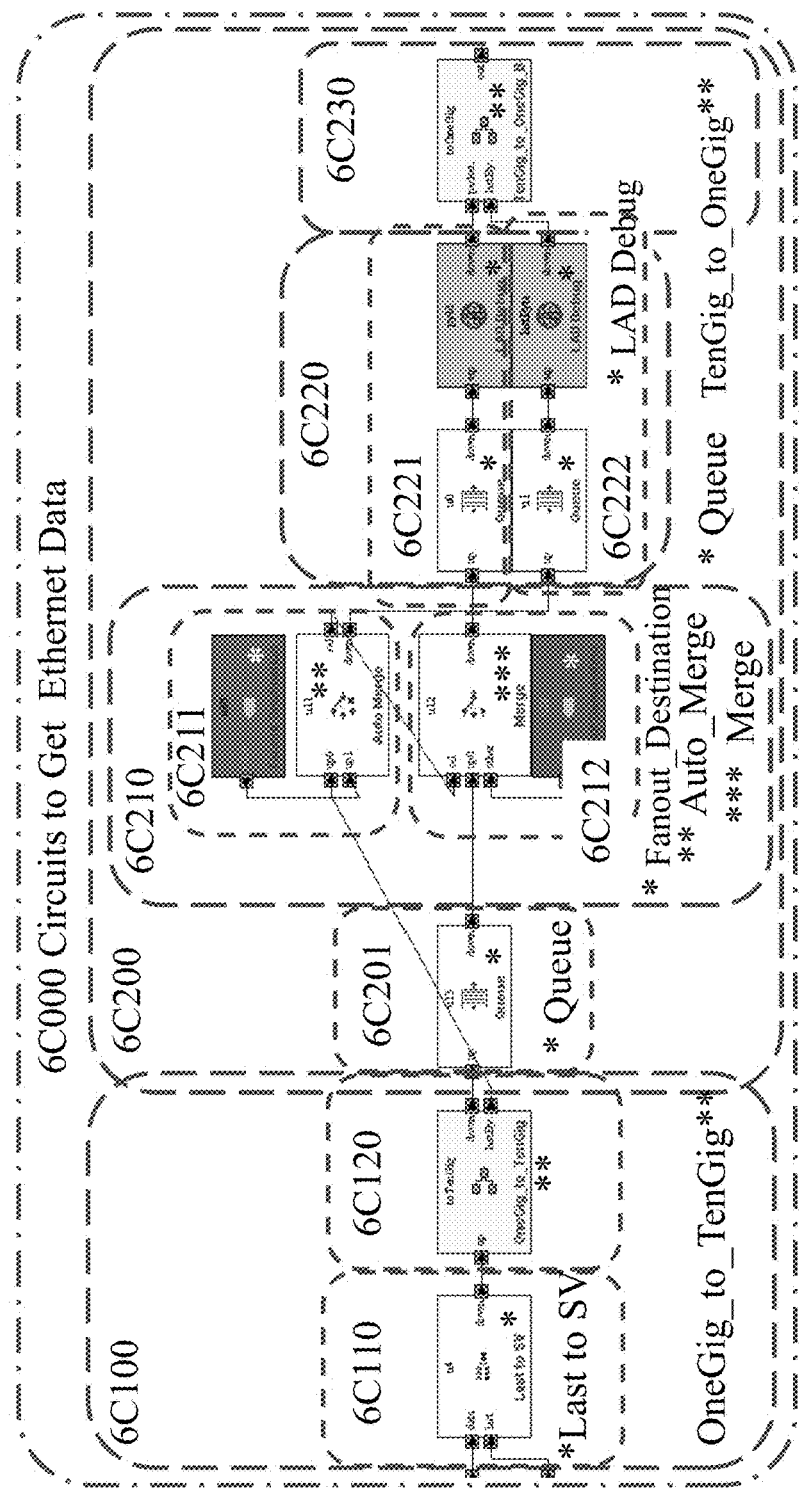
FIG. 6C illustrates an example block diagram for a circuit that implements aspects of an eCM and is configured, for example, to get Ethernet data for use, e.g. to authorize a credit card purchase.

FIG. 6C an eCM Arrow to Get Ethernet Data

FIG. 6C illustrates circuits to get data from the Internet as an arrow Get Ethernet Data 6C000. Such a circuit, 6C000, may be realized, for example, via circuits employing the method of an application of fork and join circuit arrangements of FIG. 6A combined with the method of a hierarchical arrangement of circuits of FIG. 6B. The apparatus of 6C000 may be realized via a block diagram language for digital circuit design such as Matlab® Simulink, Annapolis Microsystems CoreFire (used in FIG. 6C) and many other commercial tools for representing circuits as a block diagrams. In particular, FIG. 6C illustrates circuitry in block form from a graphical circuit design tool (e.g., Microsystems CoreFire), which allows a designer to create a circuit by editing, dragging, dropping and interconnecting blocks for particular circuitry. In some embodiments, the blocks of the graphical circuit design tool may represent portions of VHDL code, which in turn can be used to create an FPGA image Contemporary art of such block diagram languages allows the use of instruction sets, random access memory, and arbitrary feedback loops. The apparatus 6C000 avoids instruction sets, random access memory, and arbitrary feedback loops comprising instead a hierarchy of feed-forward parallel pipelines having forks, joins, queues, and other discrete logic according to the illustration of FIG. 6C.

Circuits 6C000 may comprise a hierarchical pipeline of two pipes, an initial pipe 6C100 preparing data for processing by a second pipe 6C200. Such an initial pipe 6C100 may comprise a further hierarchical pipeline of two pipes, an initial pipe 6C110 preparing data for processing by a second pipe 6C120. A block diagram language may allow brief annotation of the function of such a pipe 6C110, having a brief name such as Last-to-SV that may convey a function of creating an order among signal lines needed for a circuit 6C120. A follow-on circuit 6C120 then may perform a clocking function that converts a stream of data having a clock rate of 1 gigabit per second, "OneGig" to a clock rate of ten gigabits per second, "TenGig". Such a circuit 6C120 may generate a clock line that may be split from a data line, a clock line providing a signal to a block of circuits 6C211 in parallel with a data line providing a signal to a data queue circuit 6C201. Such an arrangement of circuits 6C120, 6C211, and 6C201 forks the information of circuit 6C120 into two distinct parallel paths, one of a clock for a circuit 6C211 with a distinct parallel path of data for a circuit 6C201. A further arrangement of circuits 6C210 may arrange a circuit block 6C211 with a parallel circuit block 6C212 having functions of fanning out data and of merging data. Such parallelism of data may be preserved in a subsequent block of circuits 6C220 having parallel queues and debug functions such as circuits 6C221 for "automerge" and circuits 6C222 for merge data. A further arrangement of circuits 6C221, 6C222, and 6C230 may comprise a join function that may join the signals from blocks 6C221 and 6C222 in a block 6C230 transforming signals from ten gigabits per second to one gigabit per second in the example of FIG. 6C.

A pipe 6C000 may comprise an input pipe to Get Ethernet Data from an Ethernet circuit 1A01 containing data from the Internet. Such a pipe 6C000 may comprise some circuits of an arrow 1A20 of FIG. 1A that may obtain a POST symbol 1A10 from the Internet.

A POST symbol may be augmented into a token by a token generating function embodied in a pipe 6C00 of an arrow 1A20 of FIG. 1A; such a token may contain such a POST symbol plus metadata such as the originating IP address, details of the POST string such as a universal resource identifier (URI) of the HTTP protocol, the date/time received, or other data relevant to processing the POST symbol. A specific POST token then may flow through the logic circuits (FIG. 1B at 1B30) of a pipe 6C000 of a valid POST transaction flowing through objects and arrows at 1A94 of FIG. 1A or of an invalid attempt to POST flowing through fault management objects and arrows at 1A80 of FIG. 1A, the pipe 6C000 providing an example of a preferred embodiment of such an information processing function.

FIG. 7 Timing of Token Processing

FIG. 7 illustrates examples of token processing that may occur in a DUPPL machine. An eCommerce machine (eCM) may realize token processing of FIG. 7 via circuits 6C211 corresponding to timing signals T1, T3, T5, and T7 of FIG. 7. An eCM may realize token processing of FIG. 7 via circuits 6C212 corresponding to data symbols 720, 721, and 730 of FIG. 7.

An eCM

Figure 8:
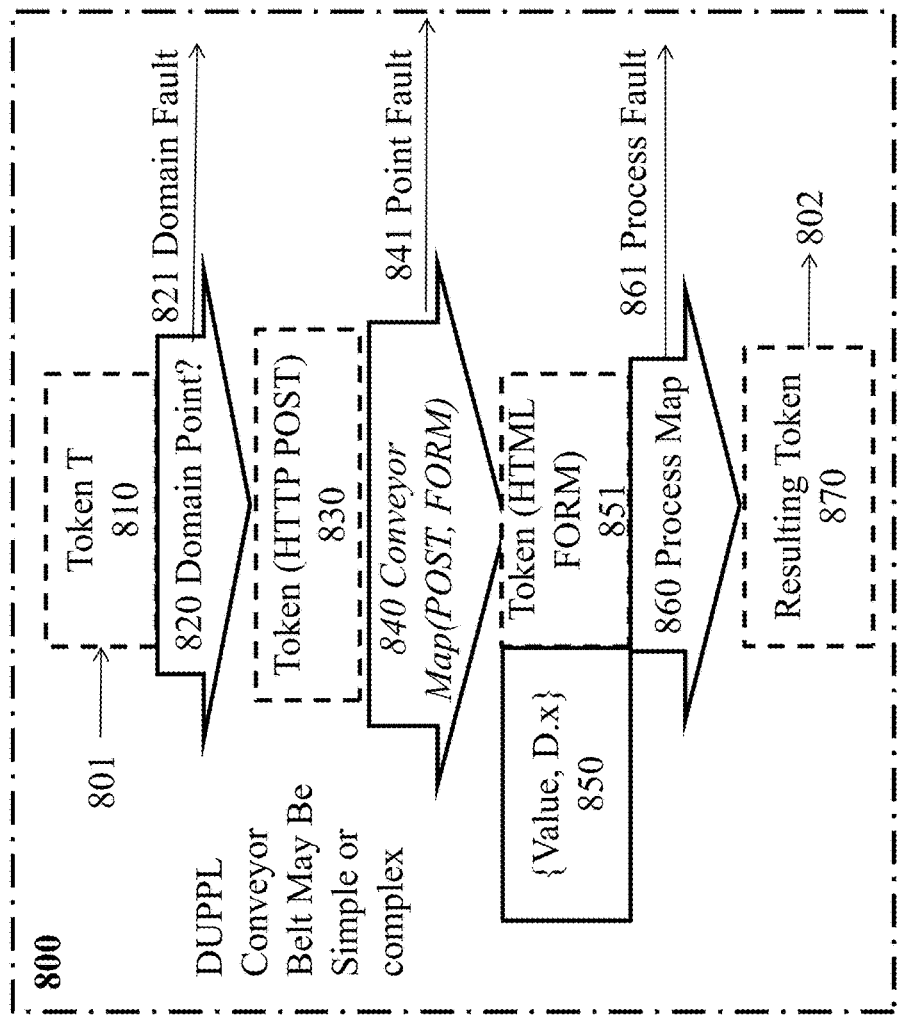
FIG. 8 illustrates an example conveyor belt for processing tokens through a sequential arrangement of arrows.

FIG. 8 Simplified Conveyor Belt

FIG. 8 illustrates an example conveyor belt for processing tokens through a sequential arrangement of arrows providing rapid access to a large collection of symbols and tokens. An eCM may include a symbol 'POST' and a symbol FORM that may have a direct one-to-one mapping realizing the conveyor belt apparatus of FIG. 8 via a signal line 840 from a POST request 830 to a value of a FORM 850 such that a POST symbol may cause the delivery of such data into such a FORM. Thus, a simple signal line may achieve the function of the DUPPL Conveyor Belt arrangement of circuits of FIG. 8.

Figure 9A:
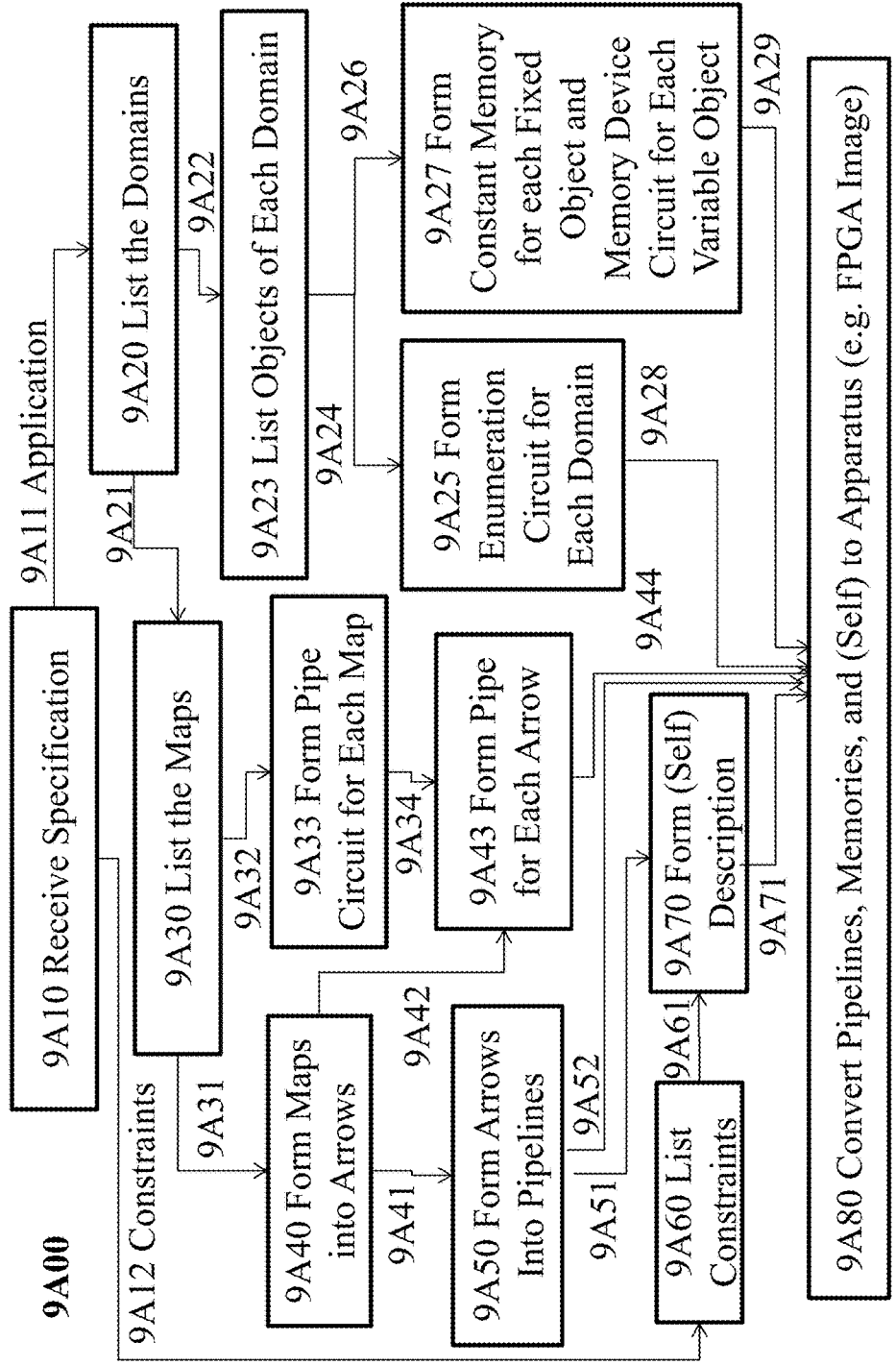
FIG. 9A illustrates an example flow chart that depicts a method for transforming a specification into a representation of a DUPPL machine that can be implemented by a reconfigurable apparatus, such as an FPGA.

FIG. 9A General Method for Transforming a Specification into an eCM

FIG. 9A illustrates an example flow chart that depicts a method for transforming a specification into an eCM. A specification of an eCM may comprise text 2B100 providing a human readable specification in a natural language such as English, Chinese, etc. Examples of such specifications include human-readable source code of one or more computer programming languages (e.g. Java, C, C++, assembly language, Ruby, JavaScript, Python, etc.), software-generated log files, and results of software tools for reverse-engineering of software such as of Java Virtual Machine (JVM) instructions or of binary executable instructions in addition to the purpose-written type of specification illustrated. Such illustrations employed do not limit the applicability of this invention to other forms of human and machine-generated and human and machine-readable specifications of the logic of a computing machine. Via symbol notation 2A00, such an eCM specification 2B100 may be expressed more compactly in a symbolic form 2B200. A method for transforming specifications 2B100 and 2B200 into an eCM comprising circuits according to FIGS. 3 through 8 is represented in FIG. 9A. Briefly, a human readable form 2B100 may guide the use of process 9A00, while a symbolic form 2B200 may comprise a (Self) description some or all of which may be embodied into the (Self) 1A90 of a resulting machine.

Designers applying the method of FIG. 9A may receive a specification according to a process 9A10. The specification may comprise a statement as illustrated in 2B100 of FIG. 2B. Designers may identify a service 9A11 expressed in such a specification. In the case of example specification 2B100, 9A11 may comprise a single service defining an eCM for recognizing HTTP GET and POST requests and serving eCommerce web pages such as to GET a database of products for sale and to POST credit card information to pipes and arrows searching a credit card database embodied into such a machine yielding output corresponding to forms of HTML web page. The method of FIG. 9A may be used to construct an eCM having a diversity of services of which 2B100 serves as an illustration. The illustrative specification of 2B100 may be referred to for convenience as eCM 1.0.

For an eCM service 9A11, there may be Domains 9A20 defining for example collections of data elements of such an eCM. An eCM 1.0, for example, may include domains TCP IP, HTTP, a database of products, a database of credit cards, and HTML expressed, for example, in English in 2B100 and expressed in symbol notation in 2B200. The domains of an eCM may comprise contents of fields of a FORM to which a POST request may provide contents. Such domains of such forms may include Name, Address, Affiliation, email address, credit card numbers and other such clearly specified sets of values allowed in such a FORM. A process 9A22 may cause the objects of each such domain to be identified, forming the contents of an object list 9A23 for each such domain 9A20. An eCM 1.0, for example, may include a Domain termed Post frame, the objects of which may be further domains according to notation 2A00 expressed as a hierarchical Domain thing (POST frame) of 2B200 containing data elements ([(Name), (Address), (email), (credit card number)]) compactly noted in 2B200 as (POST frame [Name, Address, email, credit card number]).

The application of a process 9A00 noted in FIG. 9A may result in the generation of data objects, pipes, arrows, and memory blocks, circuits, forming an apparatus 9A80 of FIG. 9A

FIG. 9B Specific Method for Transforming a Specification into an eCM

FIG. 9B illustrates additional details of how an eCM may incorporate domains like a database of products, interaction with purchasers, and authorization of credit cards via an example flow chart that depicts more specific methods for transforming a specification for an example eCM 1.0 into an eCommerce machine apparatus expanding on the method 9A00. According to the discussion of FIG. 9A, there may be a detailed eCM specification 9B10, an eCM service 9B11, e.g. to serve eCommerce forms. There may be Domains 9B20 that may include a Products Domain and a Purchaser Information Domain (e.g. of name, address, credit card information, etc.); for example, and from an enumeration process 9B22 there may be a list of objects 9B23 that may include database objects of Products and Purchasers. Pairs of objects 9B23 then may be organized as Domains of an eCM. Each such Domain may be specified such that representations (e.g. text) of a valid item of a Domain conform logically to a Domain specification expressed via process 9B24 to become circuits 9B25 for associated database pages in memory. Such memory 9B25 is not randomly accessed, but is accessed according to circuits assuring conformance to a Domain specification of circuits expressing such a Domain. Other circuits 9B27 may be identified by an analysis process 9B26 to contain fixed data such as the static Internet Protocol (IP) address of an eCM; and other contents derived from stimuli received via such packets, such as IP session state for each IP address corresponding to a session of a purchaser. A content addressable memory (CAM) may use purchaser IP address to point to session state, again using memory blocks having externally derived content, accessed via such a CAM and not randomly accessed.

A related process 9B21 may identify maps 9B30 from one object to another. In an example eCM, such maps 9B30 may include a Map: (GET product)→(HTML WebPage [product]) where a (product) occurs in a specific [place] of a larger Web Page. Via such maps 9B30, retrieval of an element of a Products Domain via GET and POST operations of the HTTP protocol examined via process 9B32 may result in values in a FORM that may be represented in a resulting Web Page 9B33. A further analysis 9B34 may consider parallelism, resulting in a collection of pipes 9B43 for realizing maps 9B30.

Process 9B00 for an example eCM 1.0 may include the analysis of maps 9B30 to identify a composite top level collection of maps, TOP, 9B40, termed an arrow as are certain collections of maps. Such arrows may include maps that are the inverse of other maps, comparisons among which may provide an arrow that is complete in a mathematical sense by which completeness of logic assures correctness of implementation. According to a further analysis 9B41 of a TOP arrow 9B40, a TOP pipeline comprising a hierarchy of arrows may be formed as a TOP Pipeline 9B50. Such a TOP Pipeline may comprise circuits to get data from an Ethernet Port 80, such as example circuitry of FIG. 6C forming an initial pipe of such a pipeline. Such a TOP arrow 9B50 may be expressed according to a process 9B52 in a symbol form of an eCM 1.0 specification 2B200 of FIG. 2B according to symbol notation 2A, forming a (Self) description 9B70. An analysis of error conditions termed faults may include an analysis of constraints 9B12 resulting in a fault recovery map 9B60 addressing all faults that may be associated with objects 9B25, 9B27, pipes 9B43, and arrows 9B50.

A map 9B60 may define methods of responding to faults detected by domain maps 1A20 and 1A40 and maps achieving logic transformations such as 1A40, e.g. as invoked by signals 1A21, 1A41, or 1A61 according to a method of fault diagnosis and recovery, machine learning, or self-reconfiguration (see FIG. 14 below) consistent with a (Self) description 1A90.

A further design process 9B52 may transform a TOP Pipeline 9B50 along with pipes 9B44, arrows 9B52, and objects 9B28 and 9B28 into blocks and flows of a block diagram language 9B80 that may be converted, for example, into a bitmap personality of a Field Programmable Gate Array (FPGA) to form an example eCM 1.0 via a bitmap of a Xilinx FPGA, for example.

The above explanation expresses and implies additional analysis for a given eCM. For example, further analysis 9B32 of a map 9B30 may determine whether it may be helpful to form a conveyor belt for rapid access to data of a DUPPL machine. A resulting expression 9B33 may associate a POST request in an HTTP Domain with the generation of a Web Page in an HTML Domain defining a conveyor belt. A further design process 9B34 may convert an expression 9B33 into a hierarchy 9B43 of unidirectional pipes having forks and joins but having no loops according to the method of DUPPL machines. A design process 9B44 may transform a POST→Page Pipeline 9B43 into blocks of a block diagram language 9B80 that may be converted along with other blocks into a bitmap personality of an eCM 1.0 FPGA. A further analysis in 9B24 of HTTP Objects 9B23 may result in circuits 9B25 checking variable memory blocks of a DUPPL machine eCM 1.0 for conformance to a given Domain. Domain checking circuits 9B25 may check for conformance to eCM 1.0 Domains TCP IP, HTTP, and HTML, for example. An associated analysis 9B26 of domain object 9B23 may further result in: a differentiation between values to be stored in constant memory blocks of Read Only Memory (ROM), such as the constant symbols SYN, POST, and the contents of a Web Page; a differentiation from variable symbols for TCP IP Packets and text received from such packets as extracted by various pipe segments of a TOP pipeline. A design process 9B29 may transform a constants and variables 9B27 into blocks of a block diagram language 9B80 that may be converted along with other blocks into a bitmap personality of an eCM 1.0 FPGA.

FIG. 10 an eCM Apparatus Top Level Service

FIG. 10 illustrates an eCommerce Transaction 1000 resulting from, for example, the service of the method of FIG. 9B to a specification 2B100. Such transactions may comprise a domain-specific machine for the domain of a specific eCommerce need such as selling Hackproof Web Machines to prospective purchasers. Such an eCM may accept an HTTP GET Product request 1010 from an IP address (e.g., 162.239.31.73); such a machine may include an arrow 1020 of pipes that may validate such a GET request; such a machine may include an arrow 1030 of pipes that may return a web page describing a given product in response to the requesting IP address of Request 1010; such a machine may deliver a products web page 1040 via the transmission of IP packets to such an IP address 162.239.31.72.

A symbol 1040 noted as "Products Web Page" may comprise a fixed sequence of text, e.g. written in the HTML language or other language for expressing web pages. Such a symbol 1040 may have a fixed value "<!DOCTYPE html>

<HTML><HEAD> <TITLE>Hackproof Technologies Inc.</TITLE> . . . </body> </html>. Such a symbol 1040 may further describe a Hackproof Web Machine that may be for sale via eCommerce on such a web site.

FIG. 11 Detailed Pipes of a POST Arrow

FIG. 11 illustrates additional details 1100 of an eCommerce machine, elaborating arrow 1020 of FIG. 10. Specifically, an arrow 1020 may examine text of a GET request such as a GET request of the form "GET//products/HackproofWebMachine/" via a sequence of pipes 1110 to 1150 achieving the logic of a Products Domain that may include/products/HackproofWebMachine/, e.g. in a directory of products. Such an arrow 1100 may test symbols thereby presented in such a GET request for conformance to an eCommerce products domain. More specifically, a pipe 1110 may receive an HTTP synchronization request, noted as SYN Request for the eCM itself, referred to as a <Static.Host.IP>; a further pipe 1120 may determine whether the text of such a GET request forms a Valid GET Request with respect to a Products Domain; that failing, control may pass from such a pipe to a fault handling mechanism which may, for example, ignore such packets; a further pipe 1130 may save an IP address from such a GET Request; that failing, control may pass from such a pipe to a fault handling mechanism which may, for example, ignore such packets; a further pipe 1140 may recognize an HTTP GET Products Request From a GET request that is synchronized; that failing, control may pass from such a pipe to a fault handling mechanism which may, for example, ignore such packets; a further pipe 1150 may validate a resulting GET request as a Valid GET Products Request; if the validation of pipe 1150 fails, control may pass from such a pipe to a fault handling mechanism which may, for example, ignore such packets.

In general, arrows such as a GET Products arrow 1020 may comprise pipes realizing more detailed logic of such an arrow, recognizing conditions of success and failure that comprise faults and directing control from a given pipe to a different pipe comprising a response to such a fault condition.

Figure 12A:
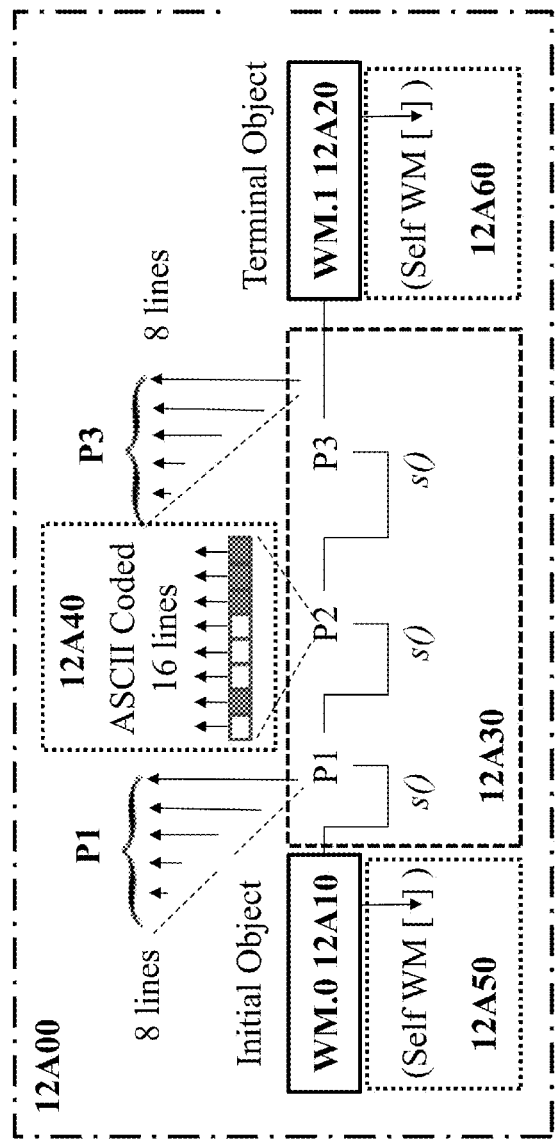
FIG. 12A illustrates an example DUPPL machine circuitry having constants for a domain of traffic light colors (TLC).

FIG. 12A Bit Level Logic for a Web Machine Products Domain (WM)

FIG. 12A illustrates an example eCM circuitry having bit-level constants for a domain of web machine products (WM). FIG. 12A describes constants of an eCM that may be a domain-specific machine for a web machine products domain. WM.0 at 12A10 may be an entry point to a web machine products domain. For simplicity of computing, a set of three web machine products for sale, e.g. termed a Hackproof web shingle machine, a Hackproof web billboard machine, and a Hackproof eCM may be coded compactly as product numbers P1, P2, and P3 respectively. Product P1 may be expressed as in a Products Web Page as the "Hackproof Web Shingle Machine" referred to within an example eCM as P1. A GET Products request may refer to products P1, P2, or P3 according to circuits 12A30. Should a GET Products request refer to products in any other way, circuits 12A30 would trigger circuits 12A60, expressing a terminal object 12A20 that may access a (Self) description containing a compact symbolic expression of the WM domain. Finding no other possible values for a GET Product request, circuits 12A00 may ignore the IP packets and terminate the associated IP session or may trigger fault recovery circuits according to the design of a given eCM.

Figure 12B:
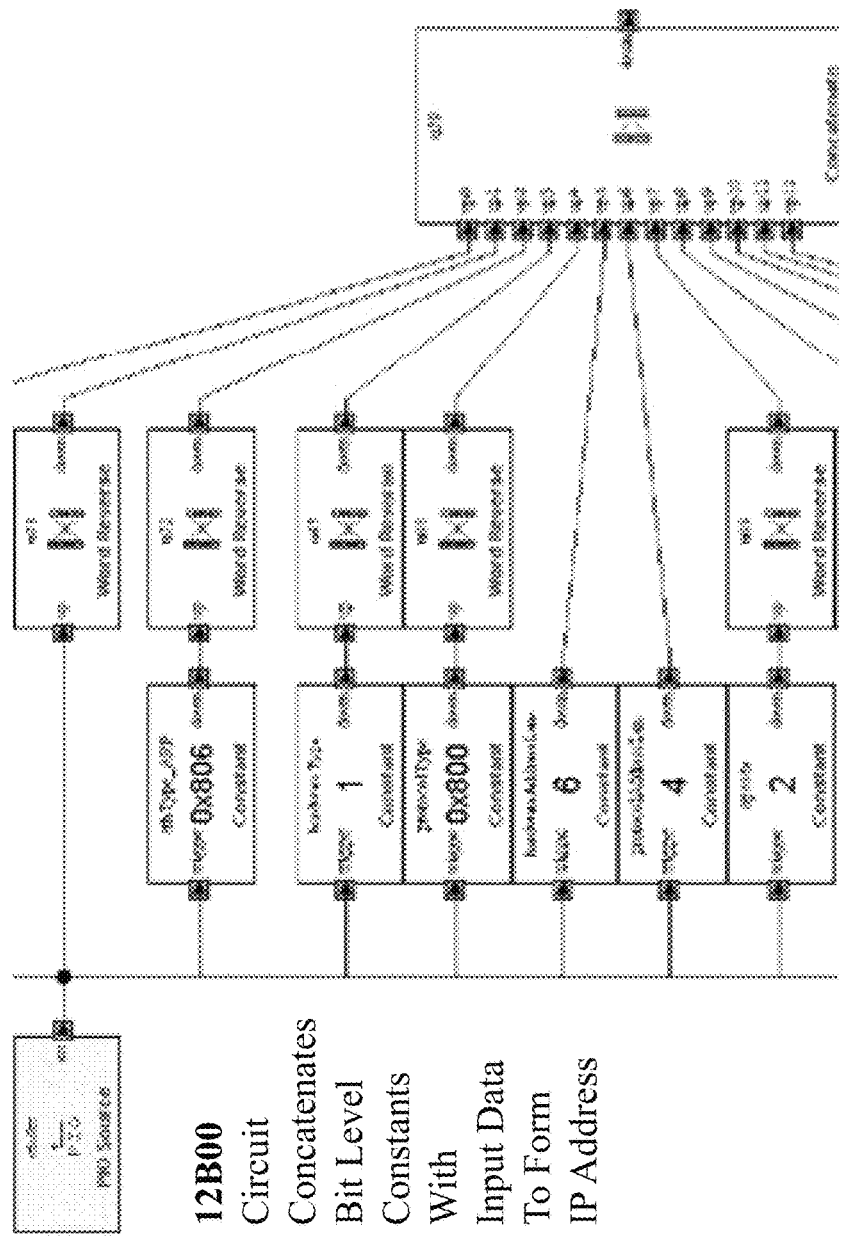
FIG. 12B illustrates example circuitry for an eCM having constants for a domain of credit card data for the eCM.

FIG. 12B Bit Level Logic for a TCP IP Domain

FIG. 12B illustrates an example circuitry of an eCM having constants for a domain of Internet Protocol (IP) addresses, a TCP IP Domain. In particular, FIG. 12B illustrates circuits for constants, word reverses and concatenation in block form from a graphical circuit design tool (e.g., Annapolis Microsystems' CoreFire FPGA design tool), which allows a designer to create a circuit by editing, dragging, dropping and interconnecting blocks for particular circuitry. In some embodiments, the blocks of such a graphical circuit design tool may represent portions of VHDL code, which in turn can be used to create an FPGA image. The circuitry 12B100 illustrated in FIG. 12B may provide a concatenation of bit level constants and input data to produce a fixed IP address, such as of a specific eCM. Bit-level constants for the decimal digits 010642 may be generated via Constant blocks, manipulated for alignment via Word Reverse blocks, and finally concatenated to form a sequence of such bits for use in a pipe of which circuits 12B100 may be a part. Such a sequence may comprise, for example, a static TCP/IP web address. Other such pipes containing fixed and variable objects (i.e. in memory blocks) and associated detailed logic of the types illustrated in FIG. 12B may be known as derived from a general design process 9A and an eCM specific process 9B and may be constructed via such software tools as CoreFire. A process of defining and building such logic may be adjusted in accordance with the needs of eCommerce, a process that may be termed softwiring.

FIG. 13A, a Conventional Mechanization of an eCommerce Service

FIG. 13A illustrates the time line of operation of a conventional hardware-software realization of an eCommerce service, 13A00 on a general purpose computer having an operating system and eCommerce service realized via a contemporary von Neumann central processing unit (CPU) having an instruction set architecture (ISA) with registers and a random access memory (RAM). The time line across the top of FIG. 13A illustrates how a conventional computer executes a web services software application, each step in sequence. At each time T1, T2, etc. the operating system (OS) and software share various instruction registers of various CPUs, saving persistent information in a large shared RAM that may be more permanently stored on non-volatile memory such as a hard drive. For example, at time T1, an Interrupt Service Routine (ISR) may respond to a hardware interrupt from the Binary Input Output System (BIOS) of an incoming packet. At time T2, the CPU then may push the data into a stack of data maintained by the OS where it may be copied into memory associated with an Ethernet process, storing IP Packets in random access memory (RAM). At time T3, an HTTP software application may recognize (via instructions operating in the CPU) that the IP packets comprise a GET request. In such a case at time T4, the OS may call other Ethernet software libraries to convert an HTML web page document "<!doctype . . . > e.g. containing a list of products for sale to be loaded into cache for transmission at time T5. Such a conventional eCommerce application of a general purpose computer 13A00 may consume a certain amount of power through the operation of its CPU, RAM, hard drive, and other computing and communications components. The presence in general purpose computer 13A00 of CPU, OS, RAM, and software provides eCommerce via a machine having myriad attack surfaces by which APT malware otherwise may manipulate such an eCommerce software application to the detriment of those involved.

FIG. 13B eCM Mechanization of the Same eCommerce Service

In contrast to such a conventional general purpose computer, an eCM may comprise hardware having pipes and arrows developed via processes 9A and 9B to result in a useful embodiment such as an FPGA illustrated in FIGS. 12A and 12B. A timing diagram 13B00 illustrates the process of conducting an eCommerce transaction via a web site served by such an eCM, such as displaying products and approving credit card purchases. The timing diagram of 13B00 illustrates data that may flow through the resulting pipes of logic; e.g. logic that forms packets at time T1 from the signals received at an Ethernet cable; further pipes of soft-wired logic that extract messages from such packets at time T2; packets that may be provided via soft-wired logic of pipes that recognize an HTTP GET request at time T3 providing such an HTML document to a potential purchaser at time T3.

Such a machine may have further pipes of soft-wired logic that may respond at time T4 to a further GET request, generating a Products Web Page specific to such a GET request, e.g. reflecting an eCommerce purchaser's choice of a product; such pipes at time T5 delivering product data previously stored in a memory block that may be dedicated to such a product; comprising further pipes which at time T6 may convert such a Products Web Page into a form of packets at an Ethernet cable addressed to appear at the IP address that issued such a Get/products request.

Such a machine may have further pipes of soft wired logic that may responds at time T7 to a POST request containing, for example, credit card data offering payment. Such pipes may incorporate credit card data previously soft-wired into such a machine, resulting in a match of the Credit data of such a post request with known credit card data of such pipes. After the match is determined, an HTML authorization to purchase one of the products may be generated at time T8. Further pipes may convert such an authorization to Internet Protocol (IP) packets at time T9 for transmission to an eCommerce purchaser, thus completing an on-line sale.

Thus, eCM timing diagram 13B00 illustrates a flow of digital information via soft-wired pipes and circuits employing block memory for intermediate results and employing fixed data to deliver content in TCP/IP packets as may be suited to an eCommerce service, such as expressing products and services via an Internet web page, selecting a product to be purchased, and validating credit card data offered by a prospective purchaser to consummate such an eCommerce transaction.

Such an eCM as illustrated at 13B00 employs no shared CPU containing registers for data since each intermediate variable may be represented in its own variable object memory block connecting a given pipe to a subsequent pipe; the value of each such variable object may be constrained by domains soft-wired into such an eCM, checked for conformity to such domains via pipes and arrows implicit but not explicit in the flow of 13B00. The absence of CPU, OS, RAM, and software in eCM 13B00 may provide information processing in a machine having no attack surfaces by which malware otherwise may have manipulated such an eCommerce service to the detriment of those involved.

Such an eCM 13B00 may consume a certain amount of power through the operation of its pipes and related communications components on a per-packet basis. The total power dissipated by such an eCM 13B00 described in FIGS. 1A through 12B may be significantly less than that of a conventional computing machine performing web services, 13A00. Such an eCM 13B00 therefore may be termed a green computing machine.

In summary regarding FIGS. 31A and 13B, APT malware may infect random access memory (RAM) of a general purpose computer. In contrast, eCM 13B00 retains information in the isolated memory blocks that cannot be randomly accessed. Specifically, the memory blocks of an eCM can only be accessed via hardware of pipes that perform various functions such as validation checks on symbols as they are passed through the pipe circuitry. As a result of such validation, each such memory block may contain only validated results that satisfy the constraints of the soft-wired domains of the specific service 9B00 being realized in such an eCM. Thus, the circuits of an eCM may prove much more resistant to software and network-based malware that uses RAM, and in some cases may be impervious to the types of malware that prey on computers having RAM.

FIG. 14, Machine Learning

FIG. 14 illustrates example eCM circuitry for fault recovery (FIG. 1, at 1A80) via machine learning. Machine learning can recover from faults in one of the several ways illustrated in FIG. 14. At 1423, for example, fault recovery may include interacting with an external entity such as a user or another eCM. An interactive fault recovery circuit 1A80 of FIG. 1A may be further explained with reference to FIG. 14. A symbol (Fault f) may occur at memory block 1401 based on a fault originating with a set of circuits 1A94, presented for fault recovery via circuits 1A21, 1A41, or 1A61. Circuits 1410 may perform fault recover via one or more of the methods 1411, 1412, 1413, and 1414 of circuits 1410. For example, circuits at 1411 may lookup fin a lookup table 1421 via token g1 containing a fault f and a request to find previously learned responses to resolve such a fault f; finding such a response, circuitry may convey such an action via path 1426 of FIG. 14 for audit at 1432 and action via circuits 1A95 at a fault recovery interface 1440. On the other hand, not finding such a previously learned result, learning circuits 1410 may search further at 1412 for resources for self-recovery according to a (Self) description 1A90 expressed at 1A96; a token g2 thus may express a request for self-recovery at 1422 based on a symbol retrieved from a (Self) 1A90; for example a first use of a symbol '%' for percentage in an expression "x % of y" may result in the retrieval of a symbol % and procedure, using, for example, symbol notation (Self [% {(x % of y) [action /x*y//100\]}]) may indicate that the (Self) recognizes '%' as a path, a sequence of steps, for performing an action, specifically action 'x*y/100'; such a symbol may convey a procedure to compute percentage by dividing the product x*y by 100; in which case "12% of 100" might transformed from a fault to a result computed at 1422 as 12*100/100, which in this example would be equal to 12, resolving the fault f of inability to recognize a symbol %. If the (Self) did not have such a symbol for %, then a further step 1413 might initiate a dialog for interactive fault resolution, e.g. via a dialog with a user moderated via interactive learning fault recovery circuits 1423, resulting in a user indicating that to compute x % of y, multiply x times y and divide by 100. Such a solution may be within a description of a (Self) 1A90 having a symbol (Self [user (*), (/)]), indicating that a user is allowed to specify a solution using multiplication and division; such checking at 1423 assures that a user interaction is moderated by the (Self). Thus a circuit 1431 may apply resulting symbol g as an /Action(result)\ at 1A85.

Such built-in fault recovery at 1422 and user interaction at 1423 may result in the storage of a (fault, response) pair (f,g) in Lookup Table 1421. Thereafter, a circuit 1411 may simply lookup fault f of a fault token g1 or g2 to employ a response g, e.g. of division by 100 to compute a percentage. Alternatively, a fault f may be unresolved at 1423, concluding the dialog, e.g. by sending an error message. In an embodiment, dialog circuits 1423 may access lookup table 1421 as a known case-base of known fault-response situations. A best match of such a case base may revise a pair (f1, g1) of such a case base to a new symbol sent to a user; in the process circuits 1431 may record an audit trail of fault f, self-description 1413, and responses g that may occur in such a dialog. A user may respond via input port that may be transferred via fault path, e.g. 1A21 to be transferred to interactive dialog circuits at 1423. Circuits 1423 may further compare user response to symbols of {g1}. Such a response may resolve the fault via interaction 1423, causing g to be employed and causing a (fault, recovery) pair (f,g) to be retained in Lookup Table 1421 and in case base 1423. That failing, a dialog may continue via 1423 until {dialog script g} may be exhausted, at which point, circuits 1423 may report to the user that fault f is unresolvable. As specified in FIG. 9A, a (Self) may incorporate symbols defining responses to faults such as the use of a % sign or other more complex patterns and results.

Over time, a lookup table 1421 may become large resulting in a slowing of operations. A self-reconfiguration circuit 1424 may detect that paths through fault recovery 1400 have become common, looking up results at 1421, slowing down such an eCM. The self-reconfiguration circuits at 1424 then may reconfigure such an eCM, e.g. via briefly taking the eCM off line and changing its soft-wiring so that faults and associated actions of the lookup table 1421 become maps of one or more new pipes in an enhanced arrow 1A40. For example a pipe after the manner of 6C000 may embody the processing of a symbol 'x % of y' with an associated logic for performing x*y and for dividing (x*y) by 100, configured based on the contents of lookup table 1421. Upon completion of reconfiguration, such an eCM may accept inputs at 1A01. After reconfiguration according to circuits 1424, the presence of the symbol % in an input at 1A10 would not cause a fault at 1A21 for failure of '%' to be contained in a Domain at 1A20, but instead would be recognized at 1A20 and mapped from input 'x % of y' to a result, in the example 12% of 100 at 1A10 may become '12' at 1A50. Thus, such an eCM may reconfigure itself according to criteria expressed in the (Self) 1A90 such as speed of processing, measured at 1431 and 1432 and having a response at 1424 according to capacities 1414 for reconfiguration.

The invention claimed is:

1. A domain-specific symbolic eCommerce apparatus comprising:
    first circuitry configured to convert a hypertext transfer protocol (HTTP) request to one or more symbols; and
    second circuitry configured to process the one or more symbols and validate the one or more symbols against one or more domains embedded into hardware of the domain-specific eCommerce apparatus, wherein each of the one or more domains indicates, via a hardwired symbolic notation, one or more values that the HTTP request is allowed to have.

2. The domain-specific symbolic eCommerce apparatus of claim 1, wherein the domain-specific symbolic eCommerce apparatus has no registers; no central processing unit (CPU); no Random Access Memory (RAM); no instruction registers; no Instruction Set Architecture (ISA); has no operating system (OS); and has no applications programming.

3. The domain-specific symbolic eCommerce apparatus of claim 1, further comprising:
    third circuitry configured to, after validating the one or more symbols against the one or more domains, output a web page as a response to the HTTP request.

4. The domain-specific symbolic eCommerce apparatus of claim 1, wherein a first of the one or more domains includes a listing comprising a first value for a 'SYN' object and a second value for a 'POST' object.

5. The domain-specific symbolic eCommerce apparatus of claim 1, wherein the HTTP request comprises an HTTP GET request or a HTTP POST request.

6. The domain-specific symbolic eCommerce apparatus of claim 1 further comprising:
    third circuitry configured to store coded and human-readable symbols, wherein the coded and human-readable symbols define a computational self-description (Self) of the domain-specific symbolic eCommerce apparatus, wherein the (Self) is used to observe, verify and control operations of the domain-specific symbolic eCommerce apparatus.

7. The domain-specific symbolic eCommerce apparatus of claim 1 further comprising:
    third circuitry configured to, after validating the one or more symbols against the one or more domains, cause the domain specific symbolic eCommerce apparatus to ignore the HTTP request.

8. The domain-specific symbolic eCommerce apparatus of claim 1, wherein the first circuitry and the second circuitry are embodied in one or more field-programmable gate arrays (FPGA) or one or more application-specific integrated circuits (ASIC).

9. An apparatus comprising:
    one or more field programmable gate arrays programmed, via one or more field programmable gate array (FPGA) images, to cause the apparatus to:
        convert a hypertext transfer protocol (HTTP) request to one or more symbols; and
        process the one or more symbols and validate the one or more symbols against one or more domains embedded into hardware of the one or more field programmable gate arrays, wherein each of the one or more domains indicates, via a hardwired symbolic notation, one or more values that the HTTP request is allowed to have.

10. The apparatus of claim 9, wherein the apparatus has no registers; no central processing unit (CPU); no Random Access Memory (RAM); no instruction registers; no Instruction Set Architecture (ISA); has no operating system (OS); and has no applications programming.

11. The apparatus of claim 9, wherein the one or more field programmable gate arrays are programmed, via the one or more FPGA images, to cause the apparatus to:
    after validating the one or more symbols against the one or more domains, output a web page as a response to the HTTP request.

12. The apparatus of claim 9, wherein a first of the one or more domains includes a listing comprising a first value for a 'SYN' object and a second value for a 'POST' object.

13. The apparatus of claim 9, wherein the HTTP request comprises an HTTP GET request or a HTTP POST request.

14. The apparatus of claim 9, wherein the one or more field programmable gate arrays are programmed, via the one or more FPGA images, to cause the apparatus to:
    store coded and human-readable symbols, wherein the coded and human-readable symbols define a computational self-description (Self) of the apparatus, wherein the (Self) is used to observe, verify and control operations of the apparatus.

15. The apparatus of claim 9, wherein the one or more field programmable gate arrays are programmed, via the one or more FPGA images, to cause the apparatus to:

after validating the one or more symbols against the one or more domains, ignore the HTTP request.

16. A method comprising:

receiving a specification that provides a definition of a hypertext transfer protocol (HTTP) eCommerce application to be implemented in an apparatus;

determining, for the HTTP eCommerce application, a list of domains, a list of variable objects and a list of maps based on the specification;

determining, for the HTTP eCommerce application, pipe circuitry for each map in the list of maps to produce a plurality of pipe circuits;

determining, for the HTTP eCommerce application, memory block circuitry for each variable object in the list of variable objects to produce a plurality of memory block circuits; and implementing the plurality of pipe circuits and the plurality of memory block circuits into hardware of the apparatus, wherein after the implementing, the hardware of the apparatus is configured to perform one or more functions of the HTTP eCommerce application.

17. The method of claim 16, wherein implementing the plurality of pipe circuits and the plurality of memory block circuits includes:

converting the plurality of memory block circuits and the plurality of pipe circuits into a field programmable gate array (FPGA) image, and compiling the FPGA image into an FPGA such that the FPGA is configured to perform the one or more functions of the HTTP eCommerce application.

18. The method of claim 16 further comprising:

determining a list of constraints based on the specification; and determining self-description circuitry based on the list of constraints, wherein the self-description defines what the HTTP eCommerce application can and cannot do; and wherein implementing the plurality of pipe circuits and the plurality of memory block circuits into the hardware of the apparatus further includes implementing the self-description circuitry into the hardware of the apparatus.

19. The method of claim 16, wherein the plurality of pipe circuits includes a first pipe that determines whether a textual symbol is a member of a first domain from the list of domains, and a second pipe that maps a symbol from the first domain to a second domain from the list of domains.

20. The method of claim 16, wherein after implementing the plurality of pipe circuits and the plurality of memory block circuits into the apparatus, the apparatus is configured to perform the one or more functions of the HTTP eCommerce application without using an Instruction Set Architecture (ISA).

* * * * *